US008988756B2

(12) United States Patent
Agrawal et al.

(10) Patent No.: US 8,988,756 B2
(45) Date of Patent: Mar. 24, 2015

(54) CONDUCTIVE BUSBARS AND SEALANTS FOR CHROMOGENIC DEVICES

(75) Inventors: Anoop Agrawal, Tucson, AZ (US); John P. Cronin, Tucson, AZ (US); Juan Carlos L. Tonazzi, Tucson, AZ (US)

(73) Assignee: Ajjer, LLC, Tucson, AZ (US)

( * ) Notice: Subject to any disclaimer, the term of this patent is extended or adjusted under 35 U.S.C. 154(b) by 505 days.

(21) Appl. No.: 13/091,032

(22) Filed: Apr. 20, 2011

(65) Prior Publication Data
US 2011/0211246 A1 Sep. 1, 2011

Related U.S. Application Data

(63) Continuation-in-part of application No. 12/865,688, filed as application No. PCT/US2009/032491 on Jan. 29, 2009, now Pat. No. 8,599,467.

(60) Provisional application No. 61/056,311, filed on May 27, 2008, provisional application No. 61/068,042, filed on Mar. 4, 2008, provisional application No. 61/063,160, filed on Jan. 31, 2008.

(51) Int. Cl.
*G02F 1/153* (2006.01)
*G02F 1/161* (2006.01)
*G02F 1/155* (2006.01)

(52) U.S. Cl.
CPC ............. *G02F 1/161* (2013.01); *G02F 1/155* (2013.01); *G02F 2202/36* (2013.01)
USPC .......................................... 359/267; 359/275

(58) Field of Classification Search
USPC ................................................. 359/265–275
See application file for complete search history.

(56) References Cited

U.S. PATENT DOCUMENTS

| 3,280,701 | A | 10/1966 | Donnelly |
| 4,712,879 | A | 12/1987 | Lynam et al. |
| 4,761,061 | A | 8/1988 | Nishiyama et al. |
| 4,902,108 | A | 2/1990 | Byker |
| 5,140,455 | A | 8/1992 | Varaprasad et al. |
| 5,239,405 | A | 8/1993 | Varaprasad et al. |
| 5,239,406 | A | 8/1993 | Lynam |
| 5,500,760 | A | 3/1996 | Varaprasad et al. |
| 5,523,877 | A | 6/1996 | Lynam |
| 5,679,283 | A | 10/1997 | Tonar et al. |
| 5,724,187 | A | 3/1998 | Varaprasad et al. |
| 5,818,625 | A | 10/1998 | Forgette et al. |

(Continued)

FOREIGN PATENT DOCUMENTS

WO WO03011939 2/2003

OTHER PUBLICATIONS

Sica, 2008 (Sica, M., The next generation of Carbon and silver ink systems for low ESR polymer tantalum capacitors, Proceedings CARTS Europe 2008 Conference (Electronic Components Association) held in Helsinki Finland (2008).

(Continued)

*Primary Examiner* — Jack Dinh

(57) ABSTRACT

This invention discloses conductive busbars and sealants for electrooptic devices including electrochromic mirrors and windows. The conductive busbars are formed from materials comprising nanoparticles, and the sealants comprise of additives that promote a two phase morphology and use of adhesion promotion additives with crosslinkers. Methods to deposit busbars and then to connect these busbars to electrical connectors are also disclosed.

9 Claims, 10 Drawing Sheets

(56) References Cited

U.S. PATENT DOCUMENTS

| | | | |
|---|---|---|---|
| 5,838,483 | A | 11/1998 | Teowee et al. |
| 5,864,419 | A | 1/1999 | Lynam |
| 5,928,972 | A | 7/1999 | Mashiko et al. |
| 6,002,511 | A | 12/1999 | Varaprasad et al. |
| 6,111,684 | A | 8/2000 | Forgette et al. |
| 6,166,848 | A | 12/2000 | Cammenga et al. |
| 6,245,262 | B1 | 6/2001 | Varaprasad et al. |
| 6,317,248 | B1 | 11/2001 | Agrawal et al. |
| 6,327,069 | B1 | 12/2001 | Allemand et al. |
| 6,432,545 | B1 | 8/2002 | Schicht et al. |
| 6,473,148 | B1 | 10/2002 | Suh |
| 6,823,124 | B1 | 11/2004 | Renn et al. |
| 6,853,472 | B2 | 2/2005 | Warner et al. |
| 6,870,656 | B2 | 3/2005 | Tonar et al. |
| 6,899,437 | B2 | 5/2005 | Bauer |
| 6,961,168 | B2 | 11/2005 | Agrawal et al. |
| 7,009,751 | B2 | 3/2006 | Tonar et al. |
| 7,045,015 | B2 | 5/2006 | Renn et al. |
| 7,064,212 | B2 | 6/2006 | Burrell et al. |
| 7,064,882 | B2 | 6/2006 | Tonar et al. |
| 7,087,878 | B2 | 8/2006 | Nixon et al. |
| 7,101,596 | B2 | 9/2006 | Sakano et al. |
| 7,292,306 | B2 | 11/2007 | Hwang |
| 7,300,166 | B2 | 11/2007 | Agrawal et al. |
| 7,425,255 | B2 | 9/2008 | Detor et al. |
| 7,457,027 | B2 | 11/2008 | LeCompte et al. |
| 7,710,631 | B2 | 5/2010 | McCabe et al. |
| 7,733,555 | B2 | 6/2010 | Agrawal et al. |
| 7,738,155 | B2 | 6/2010 | Agrawal et al. |
| 7,820,097 | B2 | 10/2010 | Schroder et al. |
| 7,855,822 | B2 | 12/2010 | Huang et al. |
| 7,864,398 | B2 | 1/2011 | Dozeman et al. |
| 2004/0233537 | A1 | 11/2004 | Agrawal et al. |
| 2006/0081819 | A1 | 4/2006 | Li et al. |
| 2006/0233953 | A1 | 10/2006 | Renn et al. |
| 2006/0285190 | A1 | 12/2006 | Agrawal et al. |
| 2007/0074316 | A1 | 3/2007 | Alden et al. |
| 2007/0206263 | A1 | 9/2007 | Neuman et al. |
| 2007/0285789 | A1 | 12/2007 | Lindahl et al. |
| 2008/0074724 | A1 | 3/2008 | Agrawal et al. |
| 2009/0002803 | A1 | 1/2009 | Tonar et al. |
| 2009/0095408 | A1 | 4/2009 | LeCompte et al. |
| 2009/0225393 | A1 | 9/2009 | Jodicke |
| 2009/0285978 | A1 | 11/2009 | Burdis et al. |
| 2010/0002282 | A1 | 1/2010 | Agrawal et al. |
| 2010/0007937 | A1 | 1/2010 | Widjaja et al. |
| 2010/0192847 | A1 | 8/2010 | Renn et al. |
| 2010/0255209 | A1 | 10/2010 | Renn et al. |
| 2011/0001095 | A1 | 1/2011 | Yu et al. |
| 2011/0080629 | A1 | 4/2011 | Neuman et al. |
| 2011/0129615 | A1 | 6/2011 | Renn et al. |

OTHER PUBLICATIONS

Moon, 2005 (Moon, K-S., Dong, H., Maric, R., Pothukuchi, S., Hunt, A., Li, Y., and Wong, C.P., Thermal Behavior of Silver Nanoparticles for Low-Temperature Interconnect Applicatons, Journal of Electronic Materials, vol. 34, No. 2, (2005) p. 168 to 175.

Li, 2006 (Li, Y., Moon, K-S., Whitman, A., and Wong, C.P., Enhancement of Electrical Properties of Electrically Conductive Adhesives (ECAs) by Using Novel Aldehydes, IEEE Transactions on Packaging and Component technologies, vol. 29, No. 4, Dec. 2006, p. 758 to 763.

Wang, 2007 (Wang, J-S., Tutt, L.W., and Burberry, M.S., Nanometals and Laser Patterning, Presented in conference "Particles 2007", Toronto, Canada, Organized by Nanoparticles.org, Rochester, NY (2007).

Fan, 2004 (Fan, L., Su, B., Qu, J., Wong, C.P., Electrical and Thermal Conductivities of Polymer Composites Containing Nano-sized Particles, Proceedings of 54th Electronic Components & Technology Conference, Las Vegas, Nevada, IEEE (2004) p. 143 to 154.

Bascom, 1975 (Bascom, W.D., Cottington, R.L., Jones, R.L., Peyser, P., The Fracture Toughness of Epoxy- and Elastomer-Modified Epoxy Polymers in Bulk and as Adhesives, J. of Applied Polymer Science, vol. 19 (1975) p. 2545 to 2562.

Coleman, 2011 (Coleman, J.N., et al., Two-Dimensional Nanosheets Produced by Liquid Exfoliation of Layered Materials, Science, vol. 331 (2011) p. 568 to 571.

Fuller 2002 (Fuller, S.B., Wilhelm, E.J., and Jacobson, J.M., Ink-Jet Printed Nanoparticle Microelectromechanical Systems, Journal of Microelectromechanical Systems, vol. 11 (1), Feb. 2002, p. 54 to 60.

Hedges 2010 (Hedges, M. 3D Large Large Area Printed & Organic Electronics via the Aerosol Jet Process, Proceedings of Large-area, Organic and Printed Electronics Convention (LOPE-C), (2010).

Jodicke 2007 (JJodicke, D., Wittkopf, H., The 2nd Generation of an Electrochromic Solar Control Glazing—Ready for Projects, Proceedings-Glass Performance Days (2007) p. 394 to 395.

Wu 2010 (Wu, H., et.al., Electrospun Metal Nanofiber Webs as High-Performance Transparent Electrode, Nano Letters, vol. 10, (2010) p. 4242-4248.

Ellmer, 2010 (Ellmer, K., Transparent Conductive Zinc Oxide and Its Derivatives in Chapter 7, Handbook of Transparent Conductors, D.S. Ginley et al. (eds.), Springer Science+Business Media LLC, (2010) p. 193 to 263.

Directive of the European Union, Restriction on the use of Hazardous Substances (RoHS), 2003.

American Conference of Governmental Industrial Hygienists® (ACGIH, Cincinnati, OH)—TLV for beryllium (2009).

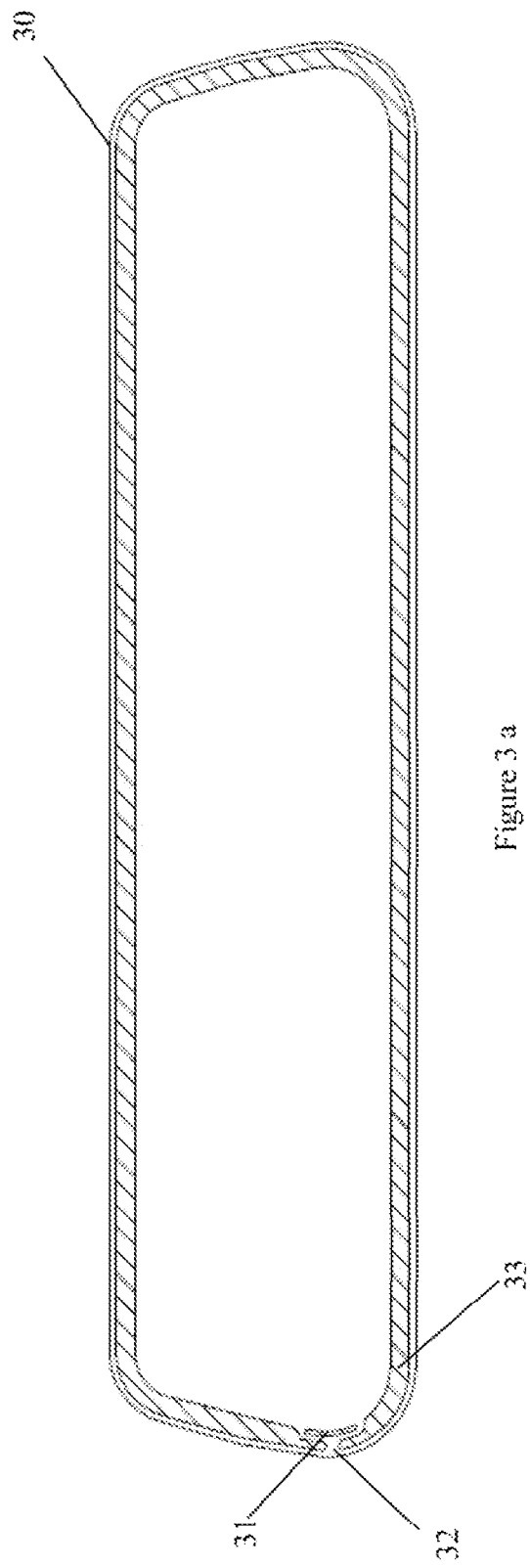
Figure 3 a
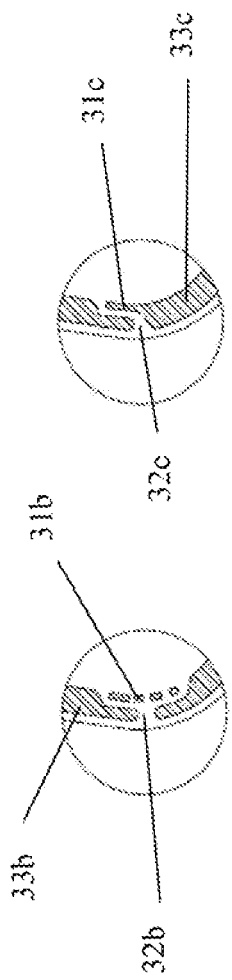
Figure 3 b
Figure 3 c

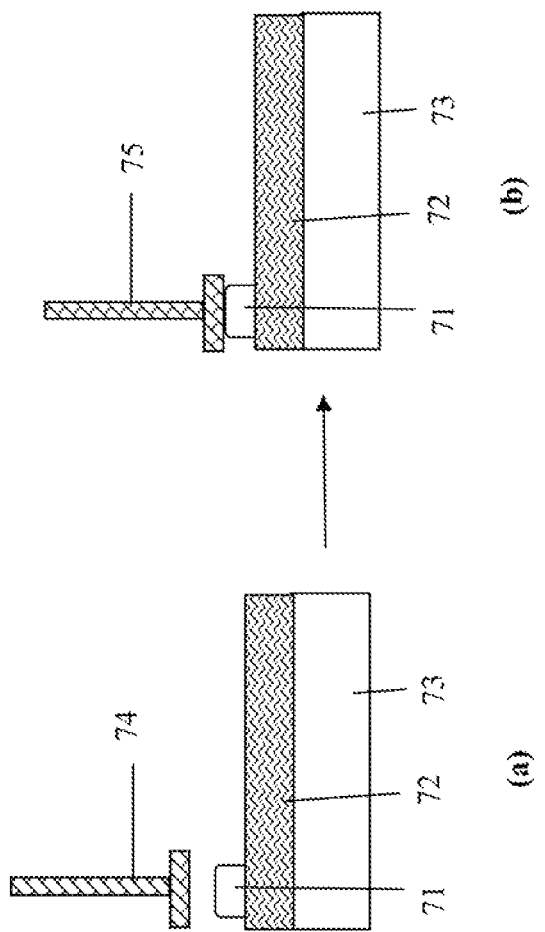

CONDUCTIVE BUSBARS AND SEALANTS FOR CHROMOGENIC DEVICES

RELATED APPLICATION/CLAIM OF PRIORITY

This application is continuation in part to US application entitled "Environmentally safe EC devices and assemblies", application Ser. No. 12/865,688, filed on Jul. 30, 2010 and PCT application Ser. No. PCT/US09/32491 filed on Jan. 29, 2009. These applications are related to and claims the priority of provisional patent application Ser. Nos. 61/063,160, filed Jan. 31, 2008 (entitled "Environmentally safe EC devices and assemblies"); 61/068,042 filed on Mar. 4, 2008 (entitled "Environmentally safe EC devices and assemblies); and 61/056,311 filed on May 27, 2008 (entitled "Environmentally safe EC devices and assemblies); all of which are incorporated by reference herein.

BACKGROUND OF THE INVENTION

Electrochromic rearview mirrors have long been incorporated into vehicles for providing automatic control of glare (variable transmission) to a vehicle operator. EC rearview mirrors are often times mounted both inside and outside the vehicle or only on the inside. Some of the patents that describe electrochromic devices usable for mirrors are U.S. Pat. Nos. 3,280,701; 4,712,879; 4,902,108; 5,140,455; 5,724,187; 6,111,684; 6,166,848; 6,853,472 and published patent application 2004/0233537. Many aspects of this invention may be used for other type of electrooptic devices (e.g., liquid crystal, suspended particle devices, user controllable photochromic devices, photo-electrochromic devices) that result in variable transmission/reflective devices for use in windows and automotive mirrors. All of these devices including EC devices are called chromogenic devices. Chromogenic devices also include photo-electrochromic or user controllable photochromic devices. The innovation disclosed here is applicable to all of these chromogenic devices that are used as variable reflectance automotive mirrors and variable transmission windows for architectural and transportation use (windows for cars, busses, airplanes, boats, etc.). The claims of this innovation exclude displays and applications related to displays.

Commercially available mirror assemblies comprise of an EC cell enclosed in a casing along with an attachment mechanism to the vehicle, powering electronics and other electrical and electronic features. These mirror assemblies may comprise of materials which are harmful to the environment. In one aspect, this invention describes novel combination of materials to reduce environmental degradation and safety, particularly for those who are involved when these systems are being made, removed, recycled or disposed at the end of their life cycle. In another aspect, the materials of this invention assist in reducing the assembly of the chromogenic cell, by reducing the material and the processing cost. Yet another aspect of this innovation is that it allows forming objects with higher performance characteristics. One of the areas where this invention focuses on are conductive busbars, both materials and processes, so that these can be made without beryllium. In addition, this invention also addresses improved perimeter sealants to enhance the device reliability. Such busbars and sealants may be used for other chromogenic rearview mirrors and window devices. These window devices may be used for architectural applications, transportation windows for vehicle use and other transportation medium (planes, trains, buses and boats). These windows may be used as optical filters, but are not used as displays.

Most EC mirrors for vehicles in the market use a construction as shown in FIG. 1a. This prior art is shown schematically as a device cross-section, where an EC mirror is constructed using two substrates 10 and 20. 21 is a transparent conductor and 11 is a layer or a layer stack which is both electrical conductor and a reflector. This is assembled into a cavity using a perimeter adhesive 15 where the cavity thickness is determined by spacers in the adhesive and/or sprinkled throughout the cavity (not shown). The interior of the cavity has an electrochromic medium 23 which may comprise of one or more layers. The electrochromic medium may be substituted by a liquid crystalline formulation or a suspended particle formulation. For electrical connections busbar clips are attached to both substrates as 17 and 18 which are then connected to powering wires 13 and 14 respectively. The busbar clips in commercial mirrors are generally made of copper-beryllium alloy as described earlier; however, beryllium free busbars are preferred for environmental reasons. In some cases one may substitute clips by conductive adhesives being used in these applications as busbars and connectors. Most current conductive adhesives use large sized silver particles (typically in microns) in an organic matrix (e.g., epoxy). However, with the quantity of the silver required and the high silver prices such adhesives are expensive. Materials that result in busbars with higher conductivity (even if silver particles are used), will be preferred, so that silver use can be reduced, and better performance can be obtained. The electrical connections and the adhesive line is concealed from the user by an opaque bezel 16, generally made out of a colored plastic material (usually polypropylene, polyurethane or acrylonitrile-butadiene-styrene terpolymer). Improved perimeter sealants with a two phase structure in the resin, which result in more reliable bonding, are also disclosed.

FIG. 1a, shows a third surface mirror. The surfaces on the substrate are counted from the side the mirror is viewed, where the first surface is outside surface of the first substrate, the second surface is the inner surface of the second substrate, the third surface is the inner surface of the second surface and the fourth surface is the outside surface of the second substrate. The third surface reflective layer may comprise of several coats of materials both transparent conductors and reflective layers. More on this is discussed in several U.S. patents such as U.S. Pat. Nos. 3,280,701; 5,724,187; 5,818, 625 and published US patent application 2004/0233537. When the reflector is on the third surface then the mirrors are called third surface mirrors, and when the reflector is on the fourth surface then they are called fourth surface mirrors. As shown in FIG. 1a, the mirror cell is assembled using two substrates (20 and 10) coated with conductive coatings (21 and 11 respectively), and these are bonded using a perimeter sealant 15. During their manufacture a small hole is left in the sealant through which the electrolyte 23 is introduced in the chamber formed by the two substrates. Typically the perimeter sealant has spacer beads which result in a controlled chamber thickness. After filling the chamber (also called cavity) the hole is generally sealed with a UV curing sealant (also called plug sealant). Clips 17 and 18 are generally used to connect the conductive coatings on the substrates using wires 13 and 14 to the rest of the electronics. This mirror is enclosed in a case and 16 shows the front bezel of the case (one may also make without bezels as discussed in US patent application 2008/0074724). In the mirror housing (behind the mirror one has electronics) to power the mirror and provide any other features. The EC devices (including mirrors from other chromogenic devices), may also be filled by the injection of the electrolyte. Typically in the injection process two ports are required in the cavity, one for filling and other to evacuate the gas in the cavity as the fill proceeds. This is described in published US patent application 20090095408 which is enclosed herein by reference. FIG. 1b shows the schematics of a complete EC mirror assembly. The EC mirror is powered and controlled by a controller which may be in the same housing as the mirror (which is generally the case) or external to it. The controller may have integrated chips which preferably should not use any components utilizing beryllium or beryllium oxide. The controller is supplied by power from the car power system or one may use a secondary (rechargeable) or a primary battery. It also receives two light intensity signals, one for glare level (typically a light transducer or sensor facing towards the rear of the car) and the other for ambient light (which is typically facing towards the front of the car), so that it can compare and decide if the glare is being caused at night by a vehicle trailing the car with the system. The controller may have other inputs such as if the car is in reverse gear or not (so that the EC mirror darkening may be disabled automatically when reversing), inputs for other added features such as for temperature, cameras for video displays, micro-phone and speaker for phone system, and may have added features such as compass, rain sensor, garage door openers, headlight control amongst many others. Many of these features are described in several patents and patent applications. Some of these are US patent application 2007/0,285,789; and U.S. Pat. No. 7,087,878. The controller (or electronics module) can be on a flexible substrate or this may be mounted behind the mirror (back side of the rear substrate). These descriptions and also where the mirror casing itself may be used as a substrate to connect electronic components is disclosed in U.S. provisional patent application 61/431,567, filed on Jan. 11, 2011, which is enclosed herein by reference. Busbars for these disclosures can gain from this innovation where these busbars can be deposited by a printing process or a spray process (e.g., Aerosol Jet technology from Optomec Inc. Albuquerque, N. Mex.), as discussed later.

Most commercial EC automotive mirrors use liquid or solid electrolytes, which when disposed have the potential to contaminate. To minimize disposal volume, it is preferred to reduce the quantity of electrolyte in these mirrors. The electrolytes typically comprise of electrochromic dyes, UV stabilizers, electrolytic salts, monomers, initiators, and polymers.

EC devices are made in many different layer configurations. EC devices shown in FIG. 1a (where no reflector layer is used, and both 21 and 11 are transparent conductors) are used in commercial air-craft EC windows. In many of the architectural windows, layer configurations as shown in FIG. 1c and 1d are used, as this reduces the back reaction. In FIG. 1c the EC device is constructed on a single substrate 10c, where 11c and 21c are transparent conductors. Layer 23c is the electrolyte (or ion conductor), and layers 24c and 25c are one of each of electrochromic layer and the counter electrode. The counterelectrode may also have electrochromic properties. As seen the electrochromic medium of this construction is sandwiched between two conductive layers 11c and 21c, which are both transparent for a window, and if one of them has reflective properties then it becomes a mirror. Also shown in this figure is a deletion line 26c which breaks the continuity of the conduction path between the two sections of the transparent conductor 11c. This deletion line may be etched using lasers or by chemical etching, or this is an area that is masked off, if the process to deposit the transparent conductor can be customized. Since the transparent conductor 21c, touches a section of 11c, this device can be powered by applying a voltage across the deletion line (which then applies a voltage across the layer stack. The busbar 27c will typically run along the side of the device or more of the perimeter depending on the conductivity of the layer 21c. Similarly, busbar 28c will be used to power the other side. As discussed later, the busbar electrical resistance is smaller than the electrical resistance of the transparent conductor it is deposited on. The reason is that the busbar may make a point contact (or at several points if the busbar is too long, so that the resistance between the points is less than about 5Ω, (preferably less than or equal to 1Ω, and most preferably less than or equal to 0.5Ω) with the electrical wire to power the device, and the voltage drop across the busbar length needs to be minimized so that the voltage can be effectively distributed evenly over most of the perimeter of the EC device. There are many variations in these devices, e.g., where each of the layers described may be composed of multiple layers with different compositions. Such devices for EC architectural windows are described in the literature, and some exemplary references are published US patent applications 20090285978, 20100007937, 20080304130.

FIG. 1d shows another type of EC device, which like FIG. 1a comprises of two substrates 10d and 20d. For windows, each of the substrates has a transparent conductive layer 11d and 21d. Layer 11d has an additional electrochromic layer 24d deposited on it and the layer 21d has an additional counterelectrode layer 25d deposited on it. The counterelectrode may also have electrochromic properties. These are then laminated together so that the lamination layer is the ion conductive or the electrolyte layer 23d. The device is sealed at the perimeter using an adhesive 29d. Further, busbars 27d and 28d are deposited along the length of the device (or even one length and one width or even the entire perimeter (as long as these do not touch). In this construction also the electrochromic medium is sandwiched between two conductive layers. An example of this kind of device is in published US patent application 20090225393 (and also see Jödicke, D., Wittkopf, H., The 2nd generation of an electrochromic solar control glazing—ready for projects, Proceedings-Glass performance Days (2007) p-394-395).

There are other electrochromic devices with different layer configurations (see U.S. Pat. No. 6,178,034). There is another type of related device that make use of the electrochromic layer in an interesting way. These are called photo-electrochromic or user controllable photochromic devices (e.g., see U.S. Pat. No. 5,838,483 and U.S. Pat. No. 7,855,822), which also use an electrochromic medium between two conductors, wherein these conductors are transparent for use as a window. These also use busbars at the perimeter to be able to connect to electric cables so that these can be electronically controlled. The busbars described in this invention being disclosed are applicable to all of these devices. Perimeter busbars may be deposited around the entire perimeter, or part of the perimeter. Busbars for many type of chromogenic devices are described in U.S. Pat. No. 6,317,248, which is included herein by reference. This patent also discusses the use of internal busbars, which are passivated so that these do not react with the layers that are deposited on them or with the ions when the EC devices are powered. In addition, transparent conductor compositions and multilayer transparent conductor compositions that are novel to EC devices are also disclosed.

BRIEF SUMMARY OF THE INVENTION

One objective of this invention is to disclose conductive busbars and their compositions that can be used to make chromogenic devices and components of electronic circuits to power these devices.

Another objective of this invention is to disclose busbar compositions with increased performance, and or decreased cost.

One additional objective of this invention is to disclose electrochromic mirrors and devices with materials which result in safer environment for the people who are associated with it during manufacture, its use and disposal, while also reducing environmental pollution.

Yet another objective is to disclose sealant compositions with superior toughness and adhesion to the substrate for perimeter sealants.

DESCRIPTION OF THE DRAWINGS

FIGS. 3a-c: Drawing of a perimeter sealant and dam construction on a rear view mirror substrate, and some examples of various dam geometries;
FIG. 7: Schematics of an electrical connector being bonded to the perimeter busbar.

DETAILED DESCRIPTION OF THE INVENTION

Embodiment 1

Busbars for Electrooptic Devices

Figure 1A:
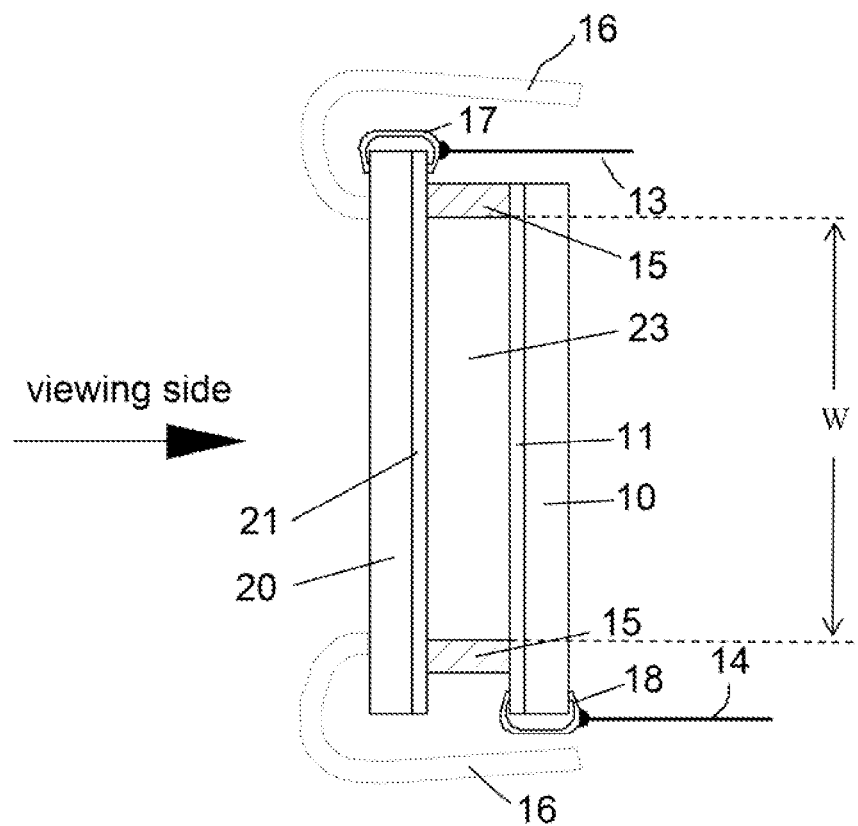
FIG. 1a: Construction of a prior art EC device.
Figure 1B:
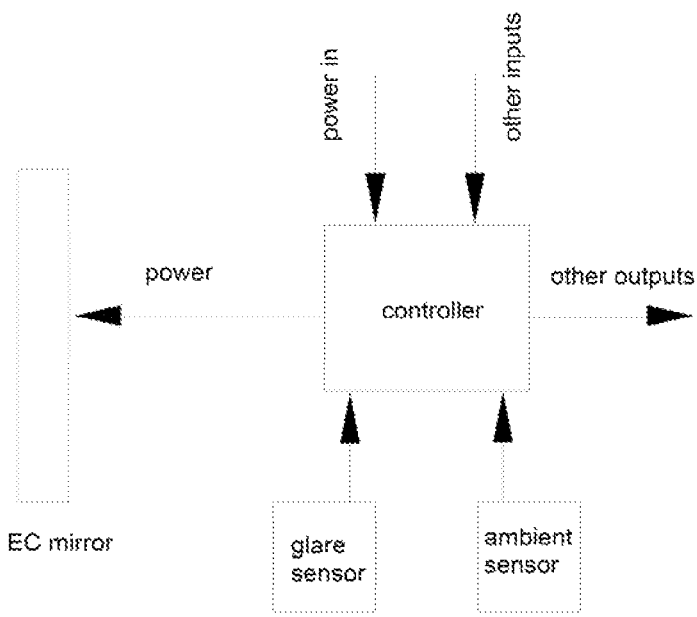
FIG. 1b: Schematics of an EC mirror assembly.

With the increased numbers of variable reflectance mirrors being used, there is a correspondingly increased desire to provide an environmentally improved variable reflectance mirror design. Millions of mirrors are being produced annually that incorporate variable reflectance elements with the above mentioned components. As an example U.S. Pat. No. 6,899,437 addresses this issue and this patent is herein incorporated in its entirety by reference. As discussed below this patent recognizes elements such as cadmium, mercury and lead and some compounds having chlorine, bromine and antimony as threats to the environment. However, this does not recognize threats caused by beryllium. Further, U.S. Pat. No. 6,899,437 takes the European directive 2002/95/EG, "Restrictions pertaining to the use of certain Hazardous Substances" (RoHS) and translates them into claims without providing any new initiative on environmental friendliness. Many countries such as Japan, China, Korea, Taiwan and some states in US (e.g., California) have laid guidelines on their own RoHS equivalent programs. The toxic materials covered by RoHS are lead, cadmium, mercury, hexavalent chromium, and brominated flame retardants more specifically polybrominated biphenyls (PBB) and polybrominated diphenyl ethers (PBDE).

Further, these restrictions also allow certain products to be exempt of specific toxins and will vary from one country to the other. in general, some of the materials that may be used for mirrors may still contain these restricted materials while meeting the European directive mentioned above. For example, lead is allowed in various products, such as copper alloys (up to 4% lead), aluminum alloys (up to 0.4% lead), which may be used for busbars. In paints, the allowable limit for lead is 0.01% (or 100 ppm) which may be used to protect reflective coatings for fourth surface mirrors. Also, lead is used in electrical cables as jackets and lead based compounds are added for stabilization and in such cases it should not exceed 300 ppm. If batteries are used to power the mirrors in case the power from vehicle is not used, then these batteries may contain up to 0.01% lead. Lead containing electronic ceramics (e.g., ferroelectric devices for memory or other applications) and high melting point solders are exempt from these restrictions. Mercury may be used in switches or in lamps for backlighting of displays; these displays are incorporated in mirrors or their housings for a variety informational outputs or videos (direction, temperature, view of the vicinity of the rear of the car from a camera during reversing). In general mercury, hexavalent chromium and cadmium (the last two are used in corrosion resistant coatings, and cadmium is also used in photo-sensors to detect glare in mirrors) has to be limited to 100 ppm. The flame retardants mentioned above may be used up to 0.1%. Norway is planning on adopting products with lower amounts of Arsenic. A product that uses Arsenic is GaAs based semiconductor chips used for communications. According to this, the products with 0.01 percent or less arsenic content (by weight) in the product's homogenous component parts is allowed. This may also be adopted by European Union and others with time. This will limit the amount and number of communication chips to be used in mirrors with GaAs that may be used for GPS, and cellular phone and other short range communication links. Clearly these regulations can change at any time and are also different for different geographic areas mentioned above, but the mirrors can comprise small quantities of one or more of lead, mercury, cadmium, hexavalent chromium, brominated flame retardants and arsenic and still meet RoHS or other regulations. In one aspect of the invention, materials with low amounts of lead, hexavalent chromium, cadmium and arsenic may be used as long as they are within the limits and regulations cited above, however, more preferred material compositions will eliminate or reduce these to much lower concentrations.

In general all hazardous materials identified in U.S. Pat. No. 6,899,437 are known in automotive industry as this has been based on the European directive and several precautions are taken in commercial products. However, hazards due to beryllium although known, are largely left unaddressed. Even U.S. Pat. No. 6,899,437 does not recognize this hazard or those due to arsenic and hexavalent chromium. All of the measures for the previously identified hazards can be optionally taken in addition to reducing the hazard from beryllium, or mirrors which only address the beryllium issue can be manufactured using this innovation. Beryllium has not been identified as a hazard by the auto industry as yet, however, given its high toxicity, particularly when handled in manufacturing and salvage industry, it is better practice to eliminate this hazard as much as possible.

Beryllium is a metal that is used in a wide variety of industries including electronics, aerospace, defense, and the Department of Energy (DOE) complexes. Exposure to beryllium containing particles can lead to a lung disease called chronic beryllium disease (CBD). CBD involves an uncontrolled immune response in the lungs that can lead to deterioration in breathing capacity and ultimately death. It is clear that even in processes where beryllium dust has been controlled to very low levels, cases of disease still persist (Managing Health Effects of Beryllium Exposure, National Research Council, The National Academic Press, Washington D.C., 2008).

In fact, there have been cases of CBD reported in people that have had no obvious direct contact with beryllium operations. Despite the fact that very low exposure levels can lead to CBD, the onset of disease can take decades. Quoted from a published article by Newman "Microgram for microgram, beryllium is one of the most toxic elements on the periodic table. When engineers select beryllium alloys for new applications, they consider its desirable properties of light weight, durability, conductivity, or neutron moderation. Unfortunately, they are often condemning workers "downstream" to a lifelong risk for an incurable illness that affects up to 20% of people exposed."

Recent new regulations from DOE dictate a permissible exposure limit of 0.2 µg/m$^3$ in air, a housekeeping level of 3 µg/100 cm$^2$ on a surface, and a release level for materials after beryllium exposure where the surface contamination due to beryllium must not exceed 0.2 µg/100 cm$^2$. American Conference of Government Industrial Hygienists (ACGIH) have recommended this to be lowered to 0.05 µg/m$^3$. The use of beryllium exposes workers who work upstream from auto component manufacturing, autoworkers, consumers and then those who are involved with the salvage industry.

Beryllium is used in the automotive mirrors in at least two places. One being the busbars or spring clips to provide power to the transparent conductors as beryllium-copper alloys and the other as beryllium oxide in the electronics where its properties of electrical insulation and high thermal conductivity are useful. The electronics for EC mirrors is housed in the mirror casing. In many shielding (from electromagnetic interference and radio frequency interference) operations, BeCu coatings and patterns are also used. Beryllium comprising alloys are also used extensively in power connectors, automotive terminals, switches and relays, SIM card contacts, switches, relays, sensors, and controls. BeCu alloys have high strength, low corrosion and excellent relaxation characteristics. Examples of beryllium copper alloys for high strength are Alloys 25, 190, 290, M25 and 165 and those alloys selected for high conductivity are Alloys 3, 10, 174 and Brush 60. Beryllium, nickel and copper alloy example is alloy 390. Alloy 360 comprises of beryllium, titanium and nickel. AlBeMet is an aluminum beryllium alloy. All of these alloys are available from Brush Wellman (Cleveland, Ohio).

Although materials for replacing beryllium in these specific applications are known, the hazard is not recognized by the auto industry and no active steps are being taken to reduce worker exposure or to reduce or eliminate the use of beryllium from components. Beryllium poses problems not only in automotive mirrors but anywhere where electronics is used as beryllium metal or as beryllium oxide. It is desirable to incorporate safe work practices or to get rid of this material from automobiles and preferably from any other consumer products and substitute with other suitable non-hazardous components. Beryllium as particles can enter the human body both through inhalation and through the skin. The particles are formed during cutting, cleaning, vapor processes, etc. Thus the greatest threat is to the workers engaged in operations with beryllium containing materials (e.g., both in manufacturing and recycling). Some of these particles are left over on the surface of the parts from prior processing operations and thus may enter the environment during use. In many components such as mirrors, high temperatures (in excess of 300° C.) are not seen while the product is in use, thus it is not necessary to use beryllium alloys that typically result in high creep resistance at elevated temperatures.

A preferred substitute for beryllium oxide for use in electronics and integrated circuit chips as a good electrical insulator and with high thermal conductivity is aluminum oxide. Aluminum nitride and aluminum oxy nitrides are more preferred alternatives. For busbars, other than the alloys comprising of beryllium and copper there are many substitutes depending on the level of performance. Since the mirrors do not consume large currents and temperatures are generally restricted below 125° C., several choices are available. Some of these are phosphor bronze, titanium and steel (e.g. stainless steel 316, 304, 303 and 302). Some of the more preferred substitutes are alloys of cobalt and chromium (which may also comprise of tungsten, rhenium, gallium and aluminum (e.g. see U.S. Pat. No. 4,382,909), tantalum, nickel, tin and copper alloys; nickel-silicon-chromium and copper alloy from Kyoei Sangyo Ltd (Tokyo, Japan); Duracon, an iron nickel and cobalt alloy from Vacuumschmelze GmBh Co Kg (Germany) and Inconel X-750. Some other choices are 301 stainless steel (UNS#530100), aluminum brass alloy 688 (UNS #C68800), phosphor bronze alloy KLF5 (UNS#C50715) and silicon bronze alloy (UNS#C65400), copper-nickel-tin alloys, copper-titanium alloys (with copper from 0.5 to about 12% by weight, preferred range being 1 to about 3%). Many of the metals may have trace amounts of naturally occurring beryllium (typically less than 100 ppm), but beryllium is not actively added in these metals or their alloys.

The preferred rearview mirror assembly in accordance with one embodiment of the present invention is substantially free of beryllium. It is within the scope of the present invention to use any beryllium free spring clips and beryllium free coatings, connectors and beryllium oxide free coatings in electronics. It is also preferred to avoid the use of beryllium comprising alloys and beryllium oxide in automobiles and its components. Further, it is important to avoid use of beryllium along with at least one of the other hazards in the mirror such as mercury, cadmium, lead, hexavalent chromium, arsenic, and bromine.

Further, one does not have to employ traditional perimeter busbars which are typically spring clips, as one can deposit them from conductive materials. Although nanoparticles can be used to form conductive perimeter busbars, which is the main focus of this application for electrochromic mirrors and windows, they may be optionally used to form internal busbar as to augment the conductivity of the transparent conductors. Busbars are typically not transparent and that is also the case of the perimeter busbars or internal busbars. This means that these are usually thick so that they are colored and absorb or reflect light or they are very hazy, i.e., scatter the light passing through, or any combination of these attributes that makes them opaque. If a solid sheet of busbar is formed by laying a number of these next to each other (without any spacing between them), the non-scattered light transmission in the visible range will be less than 1% or even may be so low that it may not be measurable. However, one can use non-transparent busbars in a fine mesh on a microscale (as described later), and still perceive that the substrate is transparent. Some busbars are formed by deposition (including spraying) of nanoparticles in a carrier fluid, which are then fused (or sintered) on to the substrate, whereas in others, composite busbars comprising conductive nanoparticles in an organic matrix are formed. In the latter, the organic binder solidifies (cools to a solid state or cures to a solid state by heat, UV or microwave, etc.) to become part of the busbar. Uses of conductive nanoparticles in formation of busbars are preferred, as this results in superior conduction (low electrical resistance). Nanoparticles in the context of this invention are those wherein at least one dimension (average thickness, average width, average length or average diameter, etc) is less than 400 nm, and preferably less than 200 nm. These may be shaped in many ways including spheres, cubes, ellipsoids, fibers (or tubes) and sheets, etc. The other dimensions, e.g., in nanofibers could be several microns long and may even be as high as 100 microns or more. Similarly the sheet width or length can be in several microns and may be even as much as 100 microns or more. Nanoparticles when used in non-conductive matrices to yield conductive materials, are usually used in lower concentrations (typically less than 5 volume %) and yet these provide high conductivity as they are able to percolate at lower concentrations. One may mix nanoparticles and larger particles in the formulation to obtain desirable properties, thus material formulations comprising a substantial amount/number of nanoparticles (or nanosized particles) are considered with the purview of the claims, as long as their presence is important for the desired properties of the busbar.

Further, when monolithic objects (e.g., busbars) are formed by fusion of nanoparticles, superior conductivity is obtained as the nanoparticles are able to fuse or melt more easily. As an example bulk silver melts at 962° C., whereas 5 nm silver particles will start fusing at 130° C. Composition of nanoparticles in the context of this innovation comprise of metals, conductive metal oxides and other conductive metal compounds (e.g. transition metal dichalcogenides, some of the conducting and semiconducting materials in this class are $NbSe_2$ and $WS_2$). In terms of conductive carbon nanoparticles, the nanoparticles comprise of carbon nanotubes and graphenes. Carbon blacks, some of which are conductive and routinely used to provide conductivity for static dissipation and for other uses. These conductive carbon blacks also comprise of nanoparticles but these are not included as nanoparticles in the framework of this innovation when only these are added to get the conductive properties. An example of this kind of carbon black is Vulcan XC72 from Cabot Corporation (Boston, Mass.). To be in the framework of the innovation being described, these conductive carbon blacks must be added along with at least one of the types of the nanoparticles disclosed above. Most metal nanoparticles, are generally very absorbent of optical radiation (UV, visible and infrared), i.e., the particles behave as good blackbodies and have high absorptivity of electro-magnetic radiation. Additionally, nanoparticles tend to have lower reflectivity and poorer thermal conductivity as compared to the bulk materials. The nanoparticle material based formulations for busbars are visibly opaque, however, due to their high optical absorption, such radiation is effectively used to process or cure patterns or traces of these formulations into highly conductive busbars. Nanoparticles also have a much larger surface area to mass ratio and have a low thermal mass individually than micron or larger sized particles. When such particles are irradiated with optical radiation they can absorb a large amount of energy relative to the substrates they are on, and due to local heating fuse and form conductive solid materials without heating the substrate (e.g., see U.S. Pat. No. 7,820,097, which is included herein by reference). Further, in some formulations a small fraction of nanoparticles with larger particles can result in favorable results. The larger particles (e.g., several micron sized flakes) may produce large overlaps, but presence of some nanoparticles of the same composition or a different composition or shape will help form well bonded conductive pathways between these by fusing at low temperature when hit with optical radiation. The most preferred metals for those busbars that are sprayed on using inks are those where nanoparticles are dispersed in a fluid medium. Typically, after deposition, the medium is either removed by evaporation or is decomposed, and the nanoparticles are fused. Some material examples are copper, silver, nickel, gold and their alloys (including alloys with other metals), and the most preferred shapes are three dimensional, i.e., spheres, cubes, ellipsoids, cuboids, or irregular shaped particles, and the most preferred sizes are those, where their size is less than 20 nm. Sometimes the nanoparticle may be deposited as nanoparticles of a metal compound, which is then converted to metal during further processing. As a specific example, nanoparticles of metal oxide (e.g., copper oxide) may be deposited where the fluid medium comprises of a reducing agent. After deposition, during the subsequent heat treatment, copper oxide is reduced to metal and fused to form the busbar. For those composites where nanoparticles are embedded in an organic matrix, the most preferred nanoparticle shapes are fibers (including tubes) and plates, where the most preferred average diameter of the fibers and the average thickness of the plates is less than 20 nm and their respective length for fibers, and length and width for plates is greater than one micron. For these composites, particularly preferred conductive nanoparticle composition for fibers are copper, silver, nickel, gold or their alloys (amongst themselves or with other metals), carbon nanotubes and plate like particles of graphene. These particles may be mixed in a conductive busbar composite. The composite materials may also be deposited by dispensing and screen printing.

A technology to deposit a stream of nanoparticles with high precision is available as M³D™ (also called Aerosol Jet Technology) process by Optomec (Albuquerque, N. Mex.). Some of the patents and patent applications where this process is described are U.S. Pat. Nos. 7,045,015; 6,823,124 and US patent applications 20060233953, 20100192847 and 20100255209 which are included herein by reference. A practical reference on adopting this for robotic implementation in manufacturing industry is described by Hedges (Hedges, M., 3D Large Area Printed & Organic Electronics via the Aerosol Jet Process, Proceedings LOPE-C 2010, Organic Electronics Association, Frankfurt, Germany, for a schematics of the spray process see FIG. 1 in this publication). These materials can also be deposited by inkjet printing process (e.g., see Fuller, et al, Journal of Microelectromechanical Systems, Vol. 11(1), (2002), page 54-60). Both of these processes are part of "spray processes" as understood in this innovation. In addition these spray processes are different from the traditional metal spray processes of plasma and thermal spray processes (e.g. see U.S. Pat. No. 7,738,155). In the traditional metal spray processes the metal particles in the spray stream are molten and some may even be atomized or ionized and are typically formed as a part of the process; in the spray processes of this innovation the nanoparticles are preformed which are then sprayed onto a substrate. Once these are on the substrate then they are consolidated or fused. Usually nanoparticles are suspended in a fluid medium (generally referred to as ink), where the fluid is removed after deposition and the particles fused using a heat treatment step. In some cases an organic binder may be used in the ink, which remains in the busbar resulting in a composite of the nanoparticles and the organic matrix so that the particles are in sufficient numbers to percolate. As an example, some of the conductive metal nanoparticle inks are available from UT Dots (Champaign, Ill.), ANI inks from Applied Nanotech (Austin, Tex.) and Metalon inks from Novacentrix (Austin, Tex.), Nanomas Technologies (Binghampton, N.Y.) and Inktec Co Ltd (Korea), Metallograpgh conductive inks from IIMAK (Amherst, N.Y.). Metalon ink ICI-003 from Novacentrix comprises of copper oxide nanoparticles along with a reducing agent in the formulation. In some cases it may be necessary to separately print a primer or an adhesion promotion layer on the substrate (includes a substrate coated with transparent conductor, or any other conductive material so that a conductive bond is formed between the coating and the busbar) before proceeding with the deposition of the busbar material. The adhesion promotion may be attained by depositing a different metal, e.g., tin, palladium, etc. Further, if the metal for busbar is copper, it may be further protected by another layer of a metal deposited on top of it, e.g., tin deposited by printing, electrolessly or electrochemically. Thus the conductive busbar can comprise of multiple layers, where these layers may not be formed from a single material composition. One may also increase adhesion to the surface by activating the surface just before the deposition of the ink (typically done in line so that the substrate moves to the metal deposition station automatically after the surface treatment). Such activation may be done by a plasma and corona treatment. A convenient method is atmospheric plasma treatment available from many companies (e.g., Tantec located in Lunderskov, Denmark and Enercom, located in Milwaukee, Wis.). Optical curing/fusing methods for inks, so that the optical beam can be focused in the area of interest are preferred as compared to heating the entire substrate, as such process is rapid and more energy efficient. When this is deposited, the follow through tool (e.g. PulseForge® tool also from Novacentrix) with laser pulses reduce the copper oxide nanoparticles to copper and then fuses them to form a continuous busbar. Typically, the nanoparticles (usually metals) are suspended in a carrier liquid to give a viscosity of about 1 to 1,000 cP (formulations are also called inks, inks that are deposited by screen printing may be more viscous). For environmental reasons these liquids should be aqueous based, however, the formulations may optionally comprise of other additives, e.g., to control the surface tension, emulsifiers, drying control additives, reducing agents, adhesion promotion agents, etc. The spray process in Aerosol Jet Technology atomizes the drops of this solution to about 1 to 5 µm in size, which can be focused on to an area, as wide as 10 to 200 µm to give a busbar of this width. More than one spray nozzle may be combined to give wider busbars without sacrificing the throughput. This stream may be guided with an X-Y-Z translation of the beam or the substrate to form a desired pattern. In this process, since the spray beam is well collimated, it avoids the traditional problems with spray processes. Further this can be applied for flat or non-planar substrates for mirrors. The metal nanoparticles are easy to sinter by heating the substrate or following up with a laser beam (e.g., Nd:YAG laser with a power less than about 10 mW) that provides local heating. Other methods of heating such as subjecting these in an oven, flowing hot gas across the deposited busbar, contacting it with a hot plate, exposing to infrared radiation etc., can also be employed. Typically the heating temperature is less than 250° C. and can also heat the nanoparticles by pulsed laser and IR heaters without heating the substrate too much (typical pulse duration is from about 10 ns to 10 ms, and pulse rates are from about a few Hz to about 1 MHz—and pulse duration is higher and the pulse rate is lower for those instruments that produce infrared heating). One can obtain electrical resistivity which is about comparable to that of bulk conductivity (within a factor of about 1 to 5 times of the bulk conductivity of the metal being deposited), both on plastics and high melting point substrates such as glass or on substrates with conductive coatings. This reduces the amount of material required for the busbar and hence its cost, particularly, when precious metals such as gold and silver are used. Since the deposited metal busbars may be thin in profile (width less than 1,000 µm, and more preferably less than 200 µm), one can minimize the offset between the two substrates as seen in FIG. 1a, which leads to thinner bezels and more flush look of the mirrors. In those devices where the substrate has an offset, or one substrate is larger than the other, the busbars may be deposited after the cavity or the cell is formed. This is because the end of the spray nozzle can be located at a large distance from the substrate (1 to 5 mm) so that the other stacked substrate does not interfere with the deposition process. The busbars can be formed of a variety of metals and alloys, or these may be composites of one material coated on top with a more corrosion resistant material. Some of the materials are silver, nickel, copper, gold, titanium, aluminum, tungsten, tin, indium, zinc and their alloys. Some of the more preferred silver alloys have alloying elements selected from one or more of gold, platinum, rhodium, palladium, ruthenium and neodymium where the weight concentration of dopants are typically less than 10% and more preferably less than about 3%. Some of the more preferred copper alloys have alloying elements selected from nickel, chromium, tungsten and molybdenum. These dopants result in improving the corrosion resistance of silver and copper while still maintaining high conductivity. Once the nanoparticles are deposited, these materials are consolidated on the surface by optical method (e.g. a following pulsed optical laser (typically in a wavelength range of about 200 (UV) to 1,000 nm (IR)). Infrared heaters typically emit even in longer infrared (IR) wavelengths and as remarked earlier may comprise of longer pulses. As an example Metalon™ inks with nanoparticles from Novacentrix (Austin, Tex.) or similar inks from Nanomas Technologies (Binghamton, N.Y.) or Inktec Co Ltd (Korea) may be used and the deposited particles fused using photonic curing (e.g., available from Novacentrix) which uses optics (pulses of light energy) without raising the substrate temperature appreciably, and can thus be used on plastics substrates, paper and glass. Preferred range of thickness of such metallic busbars is less than 25 µm, and preferably less than 10 µm. Since this process allows one to form lines on any shape, the busbars may be deposited on mirrors with non-planar substrates (e.g. for convex and multi-radius mirrors). One advantage of the deposition tool from Optomec as compared to the inkjet printer heads is the clearance between the substrate and the nozzle. Usually this clearance in the Optomec tool is much higher and could be as high as 6 mm or more. Thus one can deposit busbar on the offset regions of the substrate (if there is any, e.g., see FIGS. 1d and 2b), which allows one to deposit these busbars after the cell has been assembled (and may even be filled with the electrolyte, so that the deposition tool while depositing on the first substrate perimeter does not interfere with the thickness of the second substrate laying close to the perimeter. For thin film devices such as in FIG. 1c, the busbar may be deposited after the device has been fabricated. One may use the deposition tool from Optomec for depositing the ink, followed by a PulseForge® tool from Novacentrix to consolidate/reduce/fuse the particles to form the busbar. The busbar thickness for required conductivity may be achieved by several deposition and consolidation passes. Sometimes busbars thicker than a few microns may be formed by inks or pastes (which may be water based) which are dispensed or printed using screen printing) which can also be cured by optical means. Screen printable inks are usually viscous, with their viscosities exceeding 1,000 cP. Examples of such inks are Metalon HPS-020 or HPS-021 from Novacentrix. This utilizes silver flakes in a size of a few microns average diameter and with much thinner thickness. These inks may also be processed by oven curing. To dispense viscous materials many options are available, e.g., x-y or x-y-θ or x-y-θ-z dispensers, e.g. a commercial source is Nordson-Asymtek (Carlsbad, Calif.).

Figure 5:
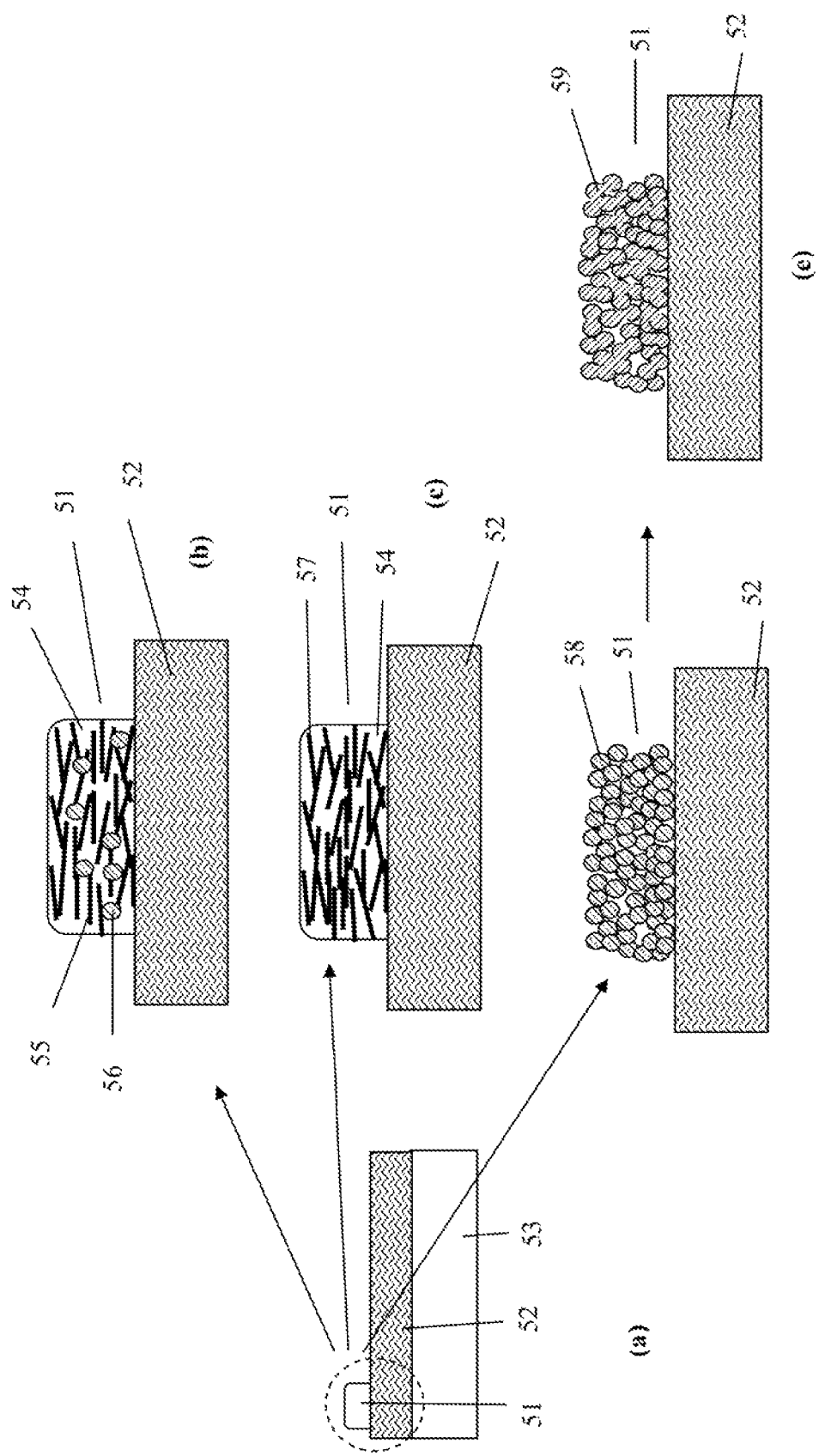
FIG. 5: Schematics of perimeter busbar with nanoparticles.
Figure 6:
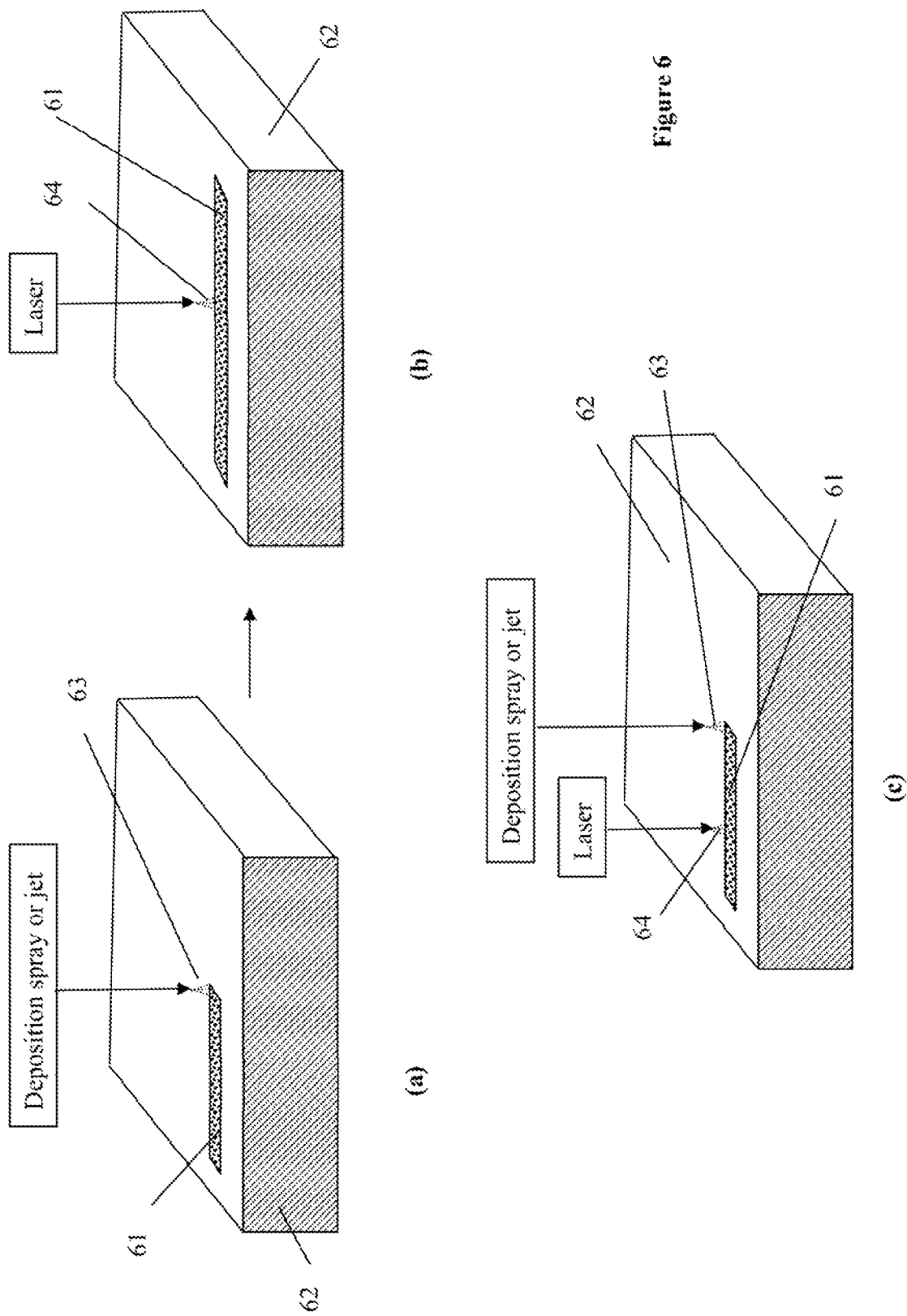
FIG. 6: Schematics of perimeter busbar deposition by spray process and a subsequent laser treatment.

Some of the concepts on perimeter busbars disclosed above are described schematically in FIG. 5. FIG. 5a shows a cross-section of a substrate 53 with a conductive coating 52 (which may be transparent) and a busbar 51. As shown by the circle, the busbar area is expanded in FIGS. 5b, 5c, 5d and 5e and in all of these the busbar is shown as 51 and the conductive coating as 52. FIGS. 5b and 5c show the busbars which comprise of conductive particles in an organic matrix. FIG. 5b shows the conductive particles as 55 and 56 and the organic matrix as 54. At least one of the conductive particles 55 and 56 are in substantial fraction nanosized. In this figure two type of conductive particles are shown with different shapes, particles 56 are shown as cylindrical or as spheres and the particles 55 are shown as flakes. In FIG. 5c the conductive particles 57 are flake like and the organic matrix is shown as 54. In FIG. 5d, the busbar is formed by nanoparticles 58 which are present in substantial amount (or particles of compounds that can be converted to conductive particles along with any additives that may be coated on these or are present in close proximity). These nanoparticle may have been suspended in a carrier fluid for deposition, but these fluids have been removed and is not shown. FIG. 5e shows the busbar after the busbar in FIG. 5d is treated to make it conductive. The treatment may involve a pulsed laser exposure. In FIG. 5e, the change after the treatment is schematically depicted by showing that the conductive particles 59 have fused. FIG. 6 shows a schematic of some of the processing concepts for the perimeter busbars disclosed above. FIG. 6a shows a substrate 62 (which is typically coated with a conductive coating on the surface which is not shown) on which a busbar with nanoparticles 61 is deposited using a spray process as shown by 63. In FIG. 6b, after the busbar 61 is deposited on the substrate 62, it is shown as being treated with a pulsed laser 64 to make it conductive or increase its conductivity. FIG. 6c shows that the busbar with nanoparticles 61 on the substrate 62, is being deposited by the spray process 63 and is being simultaneously followed by a pulsed laser 64 for additional treatment.

Figure 2A:
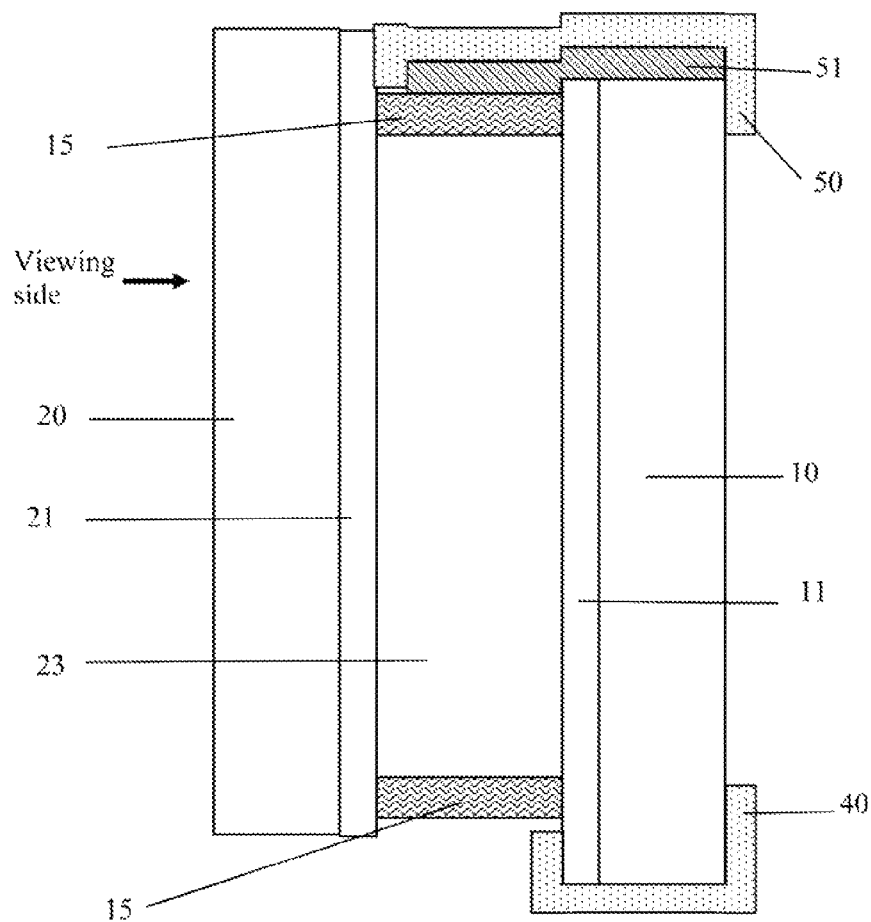
FIG. 2a: Side view (schematics) of a rear-view mirror showing electrical connections for both the busbars on the back of the rear substrate.

These busbars may also be extended from the front of the substrate to the rear of the back substrate where the connections to the electronics can be made (e.g., see published US patent application 2008/0074724). When coatings are taken from one surface (or face of a substrate) to the next surface (or face) by going over an edge of the substrate, it is preferred to avoid sharp corners on substrate edges, as these often lead to poor adhesion and/or variation in coating thickness that causes reliability issues. The edges or corners of the substrate should be rounded off or tapered to an average radius of about greater than 10 times (and more preferably 100 times) the coating thickness. As an example, for a coating thickness of about 5 microns, the average radius of curvature should be in excess of about 50 microns (and more preferably greater than 500 microns). For glass, this can be achieved by mechanical or thermal seaming. FIG. 2a shows an EC mirror device, which for convenience is shown as a third surface mirror with the reflective and conductive layer(s) being 11 on the substrate 10. This is bonded with a sealant 15 to another conductively coated transparent substrate 20 where the conductive (and transparent) coating is 21. The space between the two has an electrolyte 23 with electrochromic properties. The busbar 40 is formed so that it extends from the front of the surface to the rear. FIG. 2a is a side-section A-A of the mirror shown in FIG. 2b. In this, the mirror 1 is shown with two substrates 10 and 20 and the offset between the two is accentuated. The busbar 40 is shown with a tab 41 that extends to the back. The tab width and thickness can be any that is suitable and may be different from the busbar 40. Further there may be more than one tab emanating along the length of the busbar that are extended on to the rear and then joined. Further, one may deposit the busbar by one method, such as screen printing of silver pastes (e.g., conductive epoxies with silver particles) and then form the tab by the spray process mentioned above. An advantage of some of the metals, e.g., tin, silver, gold and copper is their ability to be connected with the wires and connectors using soldering process.

One may also use nanoparticles that are in the form of nanofibers (nano-dimension being their cross-section) or as platelets or flakes (nano-dimension being their thickness). The busbar compositions may also comprise of nanoparticles that are based on metal nanofibers and those that are carbon based, carbon nanotubes (both single walled and multi-walled), and graphene. Many of these nanoparticles and metallic nanofibers are also described as coatings in published US patent application 20100002282 which is enclosed herein by reference. Silver nanofibers are available as NGAP NF Ag-3101 from Nanogap (Spain) in a diameter of 100 nm and a length of 20 microns. Typically, metal nanofibers are grown from solutions or are electrospun. Typically carbon fibers (or nanotubes) are formed from about 1 to 25 nm in diameter, and may be 100 nm to a few microns in length. There are many suppliers of these materials e.g., NanoLab (Newton, Mass.), Nano-Carblab (Moscow, Russia), Nanocs (New York, N.Y.), Nanocyl (Rockland, Mass.)). Graphene is available as xGnP® (grade M) from XG Sciences (East Lansing, Mich.) in a thickness of 5 to 8 nm with sheet sizes ranging from 5 to 25 μm. These graphene sheets may be exfoliated further in thinner sheets (interplane distance of graphene sheets is 0.335 nm). Exfoliation of graphene is described in many publications (e.g. high surface tension fluids under high shear can be used, see Coleman et al., Science, Vol 331, p-568 to 571 (2011)). Once exfoliated, monomers, resins and polymers may be added and then the solvents can be removed to maintain the exfoliated state so that conductive busbars can be formed out of these composites. Surface areas of the materials from XG Sciences are typically 120 to 150 $m^2/g$. The graphenes can have electrical conductivity within a sheet of as high as $10^7 S/m$. In addition, the sheet like geometry allows one to form busbar materials with organic binders which are highly conductive.

In some cases, prior to the deposition of the busbar, the substrate may have to be coated with an adhesion promoter, which for organic binder comprising materials may be silane compositions as known in the art, and in some others, these may even be thin metal coatings (about 1 to 10 nm). It may also be possible to add the silanes or adhesion promoters directly to the binders as is done for adhesives (e.g., see U.S. Pat. No. 5,724,187). The organic binder comprising busbar compositions may employ several types of materials and additives (other than conductive particles) depending on the properties of the busbars and the processing methods employed. These could be corrosion inhibitors to protect the conductive particles, viscosity modifiers, UV stabilizers, plasticizers, removable solvents, fillers and tougheners for enhancing mechanical and thermal properties. The organic binders themselves could be epoxy resins, polyurethanes, silicones and acrylics. These could be thermoplastics or those that polymerize (e.g., crosslink). In the latter appropriate monomers and curing agents are used as is known in the art. The busbars may employ more than one type of conductive nanoparticles, which can be differentiated on the basis of their size, shape or composition. One combination used in an organic matrix is combining fiber or tube like nanoparticles (carbon and metals) along with sheet like nanoparticles (graphene and transition metal dichalcogenides).

One may add conductive nanoparticles to epoxy formulations that have been used for the perimeter sealants. As disclosed in the next section, by incorporating additives that result in two phase morphology in the same proportion, the mechanical toughness and adhesion of the conductive busbars (particularly comprising of rigid thermoset resins and thermoplastics as the matrix) can be increased. Further, adhesion to the substrates can be improved by incorporation of silanes and crosslinkers as also disclosed in the next section. Epoxy resin formulations for perimeter sealants are discussed in several U.S. patents, such as U.S. Pat. Nos. 5,724,187, 7,064,882 and 7,738,155. These use epoxy resin formulations based on Bisphenol A, Bisphenol F, novalacs and other epoxies, and the curing agents are usually selected from amines (usually aromatic and cycloaliphatic), anhydride and catalytic cure systems. In these formulations some of the fillers (such as silicate, titania or fumed silica) may be partly or completely substituted by conductive nanoparticles in order to get conductive busbars. For example, one may substitute exfoliated conductive nanoparticles for the nanoclays in full or partially to obtain conductive busbar materials as shown in U.S. Pat. No. 7,738,155 (see examples 11 and 12 in this patent).

The busbar from the front substrate can also be brought to the back of the rear substrate without shorting. In U.S. Pat. No. 5,818,625, a part of the rear substrate is isolated and then this isolated area is shorted with the rear substrate to allow connections from the front of the rear substrate. This is difficult and expensive to process. In this invention, this can be easily done as shown in FIG. 2a. An insulating area 51 is formed (e.g., by the same spray process or any other means) using organic or inorganic materials, e.g., this may be UV or light cured acrylic, urethane or an epoxy. Then the busbar 50 is formed on the first substrate and then preferably using one or more tabs extended to the rear of the second substrate. Again it is preferred to round-off any sharp corners and edges. The underlying insulating coating is just a bit wider than the conductive tab. One may also coat both the busbars with a non-conductive polymeric material to impart superior environmental and mechanical protection. One may affix the circuitry (along with light sensors) and displays if used directly to the terminals in the back side of the rear substrate, or it may be connected by cables. The transmissivity of the third surface reflector could be increased (by limiting its thickness or providing pin holes) so that the light emitted from the display will pass through.

The conductivity of the transparent conductors can be increased (or a highly conductive transparent conductor can be formed) by employing a fine mesh of conductive lines which is on a microscale (i.e., the width of the conductive lines and the spacing between them is on the order of 1 to 1,000 microns), also called internal busbars (e.g., see U.S. Pat. No. 6,317,248, which is included herein by reference). This is different as compared to a random mesh (on a nanoscale) of nanofibers that is formed on a substrate to give a transparent conductor for EC devices and other applications. See for example, published US patent applications 2007/0074316 and 2010/0002282 where a random mesh of metal nanofibers is used as a transparent conductor or a web of electrospun fibers is used for this purpose (e.g., see Wu, H., et al, Electrospun Metal Nanofiber Webs as High-Performance Transparent Electrode, *Nano Lett*. (2010), vol 10, p-4242-4248). These internal busbars are particularly useful for large area devices (typically larger than 200 mm×200 mm in size), e.g., electrochromic windows used for architectural applications and transportation or even for truck mirrors. These busbars are located in the interior of the device in a line or a mesh pattern, and these supplement the conductivity of the transparent conductors (when used together) to increase the current carrying capacity of the transparent electrodes. These can also be deposited using nanoparticles which are then fused together and on to the substrate, or using nanoparticle composites with an organic matrix. High conductivity meshes on 50 micron thick polyethyleneterphthalate (PET) is available from Applied Nanotech Inc (Austin, Tex.) under the trade name of EXCLUCENT™. In one product 20 µm wide copper lines are deposited after laying down the adhesion promotion layer, with a pitch of 300 µm in a square mesh pattern. The optical transmittance of such a substrate was greater than 80% and the sheet or surface resistance is less than 0.1Ω/square. For use in EC devices such mesh will have to be covered by an inert conductor such as an oxide (indium tin oxide, indium zinc oxide and aluminum zinc oxide) or a transparent layer of inert metal such as gold, ruthenium and rhodium.

Figure 4:
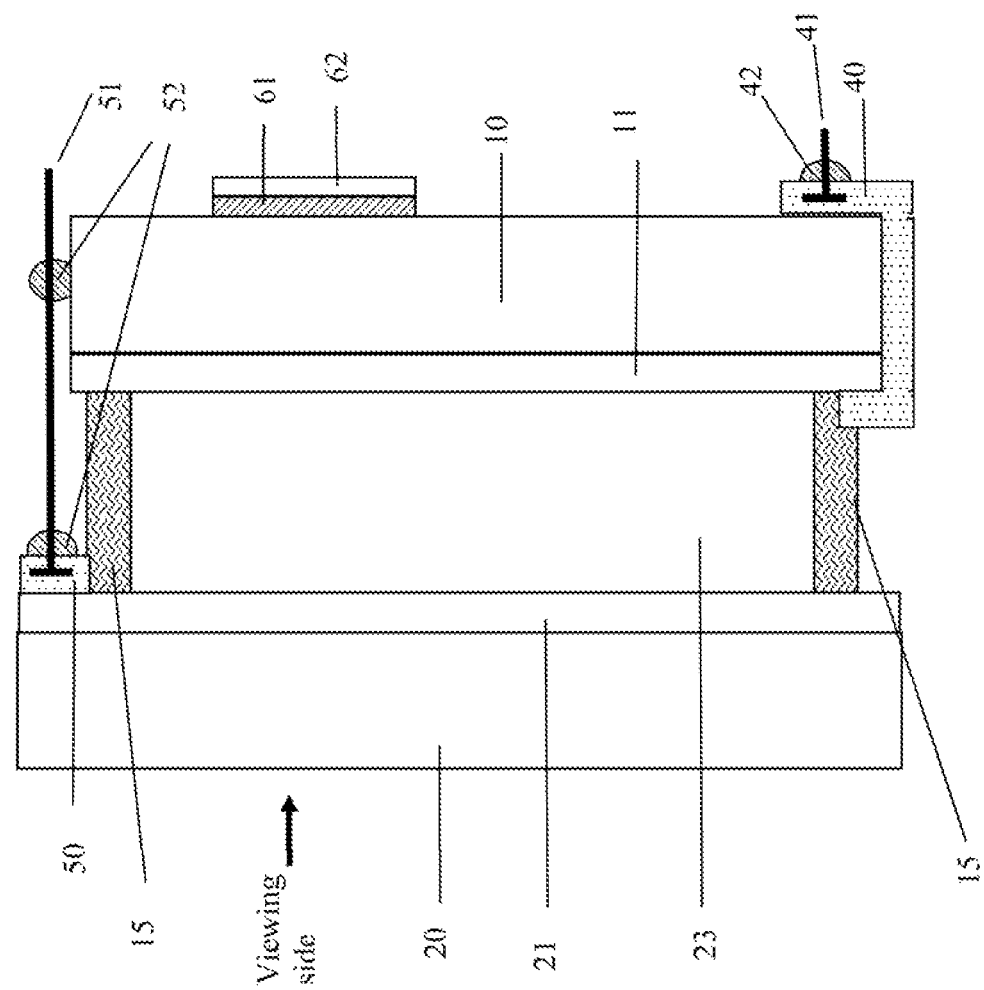
FIG. 4: Schematics of the mirror assembly showing the connections.

One may also use these principles of bringing the electrical connections to the back of the rear substrate for those mirrors which are made using no offset between the two substrates, e.g., see published US patent application US2006/0285190. In one embodiment in this patent application the main perimeter sealant is made conductive wherein about half of the sealant touches the conductive part of one substrate and about the other half touches the conductive part of the other substrate. One can use the spray or use other processes described above to form conductive paths which are in contact with the two parts of the conductive sealant and bring them over to the rear substrate of the mirror. Further these concepts of forming the busbars may also be used for those mirrors where a larger front substrate is used (larger front substrate concept is also described in this referenced published patent application). Several concepts where adhesively bonded conductive busbars are used in mirrors are disclosed in U.S. Pat. No. 7,710,631, which is included herein by reference. Particularly those embodiments where "bezel free" and "flush look" are described are particularly enabled with these busbar compositions. Metallic strips, wires, posts etc., may be attached to these busbars by soldering, adhesive bonding or partially embedding them in the busbars, so as to attach the electrical connections. In another, embodiment such posts and connectors may be formed on the busbars from the same or different materials the busbar is formed of. In this process, a three dimensional structure can be formed by repeated deposition of thin layer of the metal followed by sintering, until the desired thickness geometry is obtained. These three dimensional laser sintering is commonly used (e.g., see the LENS process from Optomec for laser sintering of nanoparticles, or rapid prototyping/manufacturing systems from 3D systems Rock Hill, S.C.)). FIG. 4 shows a mirror construction with a flush or bezel free look. FIG. 2a shows an EC mirror device, which for convenience is shown as a third surface mirror with the reflective and conductive layer(s) being 11 on the substrate 10. This is bonded with a sealant 15 to another conductively coated transparent substrate 20 where the conductive (and transparent) coating is 21. The space between the two has an electrolyte 23 with electrochromic properties. The busbar 40 is formed so that it extends from the front of the surface to the rear. This busbar can be formed of materials comprising nanoparticles. For electrical connection a metallic post 41 is partially embedded in this busbar. An optional adhesive tag 42 (which may be a conductive adhesive) is put down to improve the mechanical reliability of the post. Similarly, a busbar comprising of nanoparticles is put on the front substrate shown as 50. This also has a metallic post 51 which is partially embedded in the busbar 50. Optional adhesive 52 may be used to improve the mechanical reliability of the post.

Another way to attach post (or any electrical connectors) to the busbar surface is by soldering, or by welding. Particularly, solid state welding methods (or forging methods) are preferred, where these posts are attached to the busbar by generating local heat energy so that the post material and the busbar material under pressure locally bond to form a welded joint. This is typically done by generating electrical resistance heat or friction heat by mechanical oscillation (including at subsonic and ultrasonic frequencies). The heat generated and, with the addition of a lateral force the materials plastically displace or deform and fuse. An advantage of this method is to join dissimilar materials, e.g., SpinWeld Inc of Waukesha, Wis. (http://www.spinweld.com/weldable-materials.php) provides a list of number of dissimilar materials that can be bonded, particularly useful materials for busbar bonding are aluminum or copper (or their alloys) to silver, nickel or copper or their alloys. One may use linear oscillatory or any other type of relative motion to generate this friction. A coating of a third material may be optionally put on the busbar or the post (or the electrical connector) that will come in contact with both object surfaces (post and the busbar) to be joined to facilitate the welding process. Although in solid state welding a molten pool of metal is not formed, but one use modified processes where localized melting may also occur, especially when nanoparticles may be present at the interface, or in the coating material as discussed above. Such processes are fast, materials with dissimilar compositions can be joined, can be automated and result in joints with very high bond strengths. Some of the companies that provide such solutions are Thompson Friction Welding (Clinton City, Mich.) and Manufacturing Technology Inc (South Bend, Ind.). Optionally such joints may be further reinforced with flexible or rigid adhesives which may be conductive or non-conductive. Using such processes the connectors can be connected to conventional busbars including spring clips or to the busbars which are formed by deposition of conductive nanoparticles or conductive particles in an organic matrix. FIGS. 7a and 7b shows a schematic representation of bonding an electrical connector to a busbar. In both the figures substrate is shown as 73, the conductive coating is shown as 72 and the busbar is shown as 71. The busbar may be of the type deposited on the substrate or any other type. The electrical connector 74 is shown in FIG. 7a before bonding and it is shown as 75 in FIG. 7b after bonding. The connector shape may be any and not correspond with the schematic shape shown in these figures. Also its footprint may be the same width as the busbar, or be bigger or smaller or have a different shape attribute (rectangular, circular, etc). As discussed above the material of the connecter may be different as compared to the metallic component in the busbar.

These busbars for mirrors and windows may be along most of the length of the device (about half of the perimeter or slightly less) as shown in FIG. 2a, or these may be all around the perimeter. For all around the perimeter, the thickness of these should be such so that these do not interfere with each other or the gap (thickness) of the electrolyte layer 23. Generally, the thickness of such busbars for electrochromic devices is about 1 μm to about 500 μm, and preferably less than 20 μm. The width of these may be any as long as it is within the design considerations of the mirror. Typically, this width is between 1 to 5 mm. However, as discussed earlier with high conductivity metal busbars, this may be reduced in width to as low as 10 μm. The conductivity of the busbars is preferably greater than the conductivity of those surfaces where these are deposited to get a more uniform voltage distribution, e.g. when these are put on transparent conductors (those used for electrochromic or liquid crystal or other chromogenic windows, mirrors, visors and others). One rule of thumb was proposed in US patent application US2004/0233537, where in the electrical resistance of the busbar in a length of about half the perimeter of the device, should be less than by at least a factor of 2 as compared to the surface resistivity of the transparent conductor or any conductive coating that this is deposited on. More preferably this factor should be less than 10 and most preferably less than 25. As an example, if the surface resistance of a transparent conductive coating on a substrate is 15 ohms/sq, then the perimeter busbar resistance in a length of about half the perimeter of the substrate/device with this transparent conductor should be less than 7.5 ohms, and more preferably less than 1.5 ohms and most preferably less than 0.6 ohms. If a busbar does not conform to this norm then its electrical resistance can be changed by changing to a material with different conductivity or by changing its dimensions, i.e., its width and thickness. One advantage of extending the busbars to the sides and the back of the substrate is the use of wider and thicker busbars due to reduced design and functional interferences.

Conductive or resistive busbars can also be used to form heater pad traces behind the mirrors (typically deposited on the fourth surface (back surface of the rear substrate). Typically thick resistive carbon films are screen printed for this, however, one may deposit thin films by the spray processes (including inkjet printing) as described earlier. Some of these inks can be obtained from Asahi Research Laboratory Co (Tokyo, Japan). The spray processes may also be used for depositing dielectric and electrically insulative materials. For these inks it is not necessary that these have the nanoparticles. An insulting UV curing ink 65 is available from Norland (Cranbury, N.J.). Loctite 3492 available from Henkel Corp (Rocky Hill, Conn.). Typically, for spray processes, the ink viscosity is lower than 5,000 cP, and preferably lower than 1,000 cP.

Embodiment 2

Perimeter Sealants

Epoxy adhesives are most commonly used as perimeter sealants in EC devices (perimeter sealant is shown as 15 in FIGS. 1, 2a and 4; and as 31 and 33 in FIG. 3a; and as 31b and 33b in FIG. 3b; and as 31c and 33c in FIG. 3c. Such sealants are well described in many U.S. patents, such as U.S. Pat. Nos. 5,724,187; 7,064,882 and 7,738,155. These use epoxy resin formulations based on Bisphenol A, Bisphenol F, novalacs and other epoxies, and the curing agents are usually selected from amines (usually aromatic and cycloaliphatic), anhydride and catalytic cure systems. None of these describe additives to the epoxy resins that result in formation of a second phase upon curing of this epoxy. These additives improve adhesion and the joint toughness (e.g. see Bascom, W. D., et al, Journal of Applied Polymer Science, Vol. 19, 2545-2562 (1975)). To improve the toughness of the brittle epoxies, one adds a material which has different mechanical properties (particularly elastomeric or lower mechanical modulus as compared to the epoxy resin). These additives either chemically react or have good adhesion to the epoxy matrix. Some of these materials are Hypro 1300X8, Hypox RA840 (from CVC Thermoset Specialties, Moorestown, N.J.) and Fortegra 100 (from Dow Chemical Co, Midland, Mich.). Hypox RA840 is an adduct prepared by reacting an epoxy resin and a elastomer pre-polymer (carboxy modified butadiene acrylonitrile rubber). Hypro 1300X8 is an elastomer pre-polymer (carboxy modified butadiene acrylonitrile rubber). Typically when the latter is used, it is preferred that this is pre-reacted with the epoxy resin before the epoxy resin is incorporated into the adhesive. These materials can be added to any of the epoxies used for the perimeter sealant described in the above patent references. Typical addition quantities based on the epoxy resin (without curing agent and the additives) range from about 5 to 25 parts by weight, and preferably about 10-15 parts by weight. As the epoxy adhesive cures, second phase elastomeric particles phase separate, which are still bound or adhered to the matrix. Such particles result in reducing brittle fracture by changing the stress field in the adhesive so that mechanical failure requires more energy to be dissipated. In addition, it is also preferred that adhesion promotion agents such as organo-silanes are added to the epoxy so that a separate surface priming step (before the application of the adhesive) can be avoided. Organo-silanes have at least one organic group that is capable of reacting or having compatibility (in order to increase adhesion) with the organic sealant (e.g., epoxy sealant). For sealant to effectively bond to the substrates, one may use an organo-silane with groups having compatibility and reactivity with both the sealant and the substrate. One may also get this property by mixing two organo-silanes where one has reactivity or compatibility with the substrate and the other with the sealant. As discussed below when more than one organo-silane is mixed with the crosslinker and pre-hydrolyzed, then superior properties are obtained. To improve the efficacy of these adhesion promoters, it is also preferred that such sealants further comprise of crosslinkers. These crosslinkers are silanes with higher number of hydrolysable functionalities, usually greater than three. In order to keep the thermal properties of the epoxy unchanged, such modifiers (silanes and the crosslinkers) are typically added in a concentration of 1-3% based on the epoxy resin. The molar ratio of the crosslinker to organo-silane usually varies in a range of 1:3 to 9:1. Some examples of organo-silanes that are used with inorganic substrates for use with epoxy resins are gamma-aminopropyltriethoxysilane and 3-Glycidoxypropyltrimethoxysilane and examples of crosslinkers are 2bis(trimethoxy-silyl)ethane and tetraethoxyorthosilicate. It is preferred that before the silane and the crosslinker is added to the epoxy, these are premixed and also the mixture is pre-hydrolyzed. Other additives such as colorants (titania, carbon black, other colors), inorganic fillers (calcium carbonate, silicates, clays), viscosity modifiers (e.g. fumed silica), UV stabilizers, spacers (to control the thickness of the adhesive, spherical spacers, such as those of glass and crystals may be added. These fillers may also be surface treated with silanes or other materials to provide good adhesion to the matrix. For example, epoxy silane may be used to coat calcium carbonate, silicate and titania fillers before they are incorporated in the adhesive. Many of these materials including the spacers are preferably coated with silanes (e.g., many inorganics coated with hydrophobic epoxy silanes for epoxy adhesives) are available from Malvern Minerals Company (Hot Springs, Ak.) as CARBOKUP®, NOVAKUP®, CLAKUP®, TITAKUP®, etc.) Preferred fumed silicas are hydrophobic (for example Cab-O-Sil® TS720 from Cabbot Corporation, Boston, Mass.), but in some cases hydrophyllic fumed silica (e.g., Cab-O-Sil® M-5P) may also be used. Sealants for the perimeter seal should preferably have an inorganic content of greater than 50% by weight in order to keep the expansion coefficient of the sealant closer to that of glass, and also reduce water uptake/transmittance. These epoxy resins may also be used for busbars, where preferably all or part of the inorganic fillers are replaced by the conductive nanoparticles. Also, the above mixture of organo-silanes and the crosslinkers may be used as primers for surfaces, prior to the deposition of the sealant. In this case silanes may not be added to the sealant. Typically such primers are made as dilute solutions (about 0.5 to 2% by weight of silane and crosslinkers). Typically the solvent used for these primers is a low boiling point alcohol (methanol, ethanol, propanol, etc.), with about 1% water by weight and 0.1% hydrolyzing catalyst such as acetic acid by weight. The amino-silanes may be self catalyzing without the addition of any additional catalysts.

Further, the sealant may comprise of both, at least one toughening agent and the adhesion promotion material, where the adhesion promotion material comprises of at least one organo-silane and one crosslinker. The adhesion promotion material may be pre-hydrolyzed before adding this to the sealant resin.

Embodiment 3

Transparent Conductors

Figure 1C:
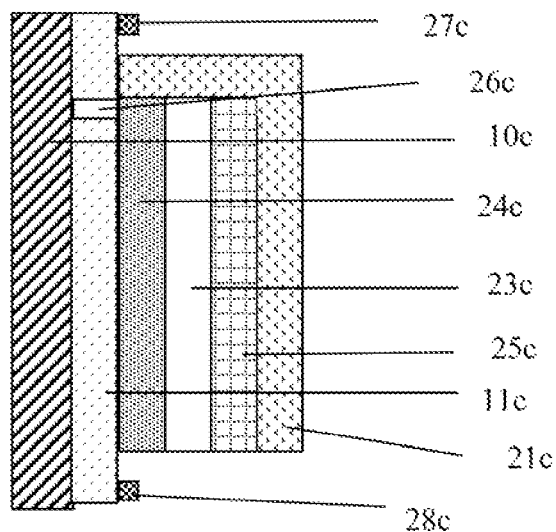
FIG. 1c: Schematics of an electrochromic device.
Figure 2B:
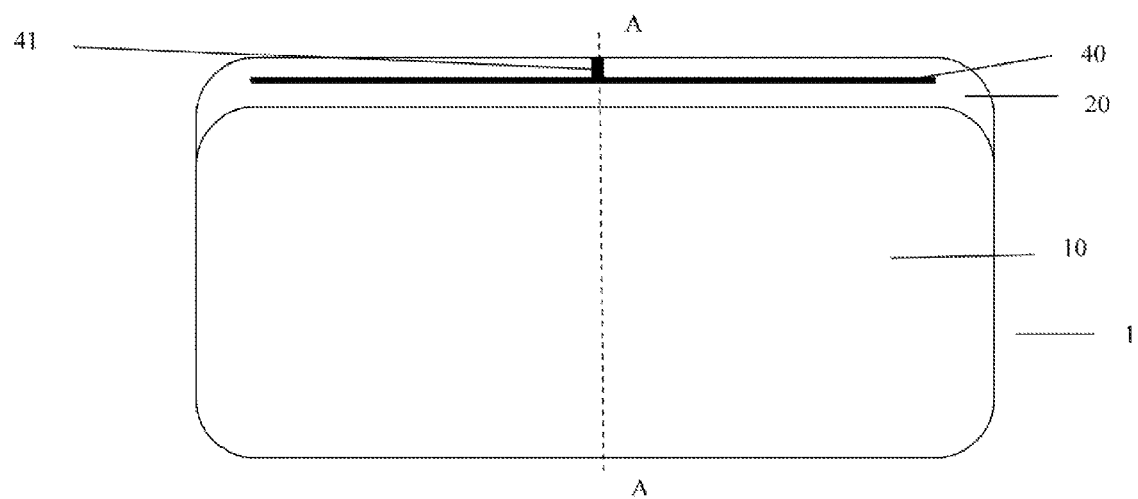
FIG. 2b: Front view of a mirror with busbar which is extended over the edge.

The commercial EC devices use indium-tin oxide (ITO) or fluorine doped tin (FTO) oxide as transparent conductors (TC). Further, in the same device either the same composition or two different compositions of TC may be used. As an example, in third surface mirrors (see U.S. Pat. No. 7,300,166), the TC coating on surface 2 (the front substrate) may be ITO, and on surface 3 (rear substrate) a reflector coating is followed by a conductive passivation layer (against chemical and electrochemical corrosion) that may be doped zinc oxide (e.g., AZO or aluminum doped zinc oxide and magnesium doped zinc oxide, in oxide TCs, the metal dopants are also in the oxide forms) or antimony doped tin oxide. The conductivity of this TC layer may not be high, as the metal below provides sufficient conductivity. Due to the scarcity of indium, substitutes for ITO are being sought, and particularly these new TCs are targeting markets for solar cells and displays. Some of the emerging materials from this work that can be used for EC devices (particularly for windows and mirrors), are oxides with multiple dopants, such as ternary oxides or those with more dopants. Some examples are oxides of Gallium+Indium+tin; oxides of Gallium+Indium+zinc; oxides of zinc+tin+indium and oxides of Zinc+tin+antimony, etc. However, preferred oxides for low-cost are those that do not comprise indium or have indium in low concentrations (typically below 20 atomic %), such as zinc oxide which is doped by at least two other materials, e.g., gallium and aluminum oxides (see published US patent application 20090085014, for sputtering targets of these materials) or gallium and manganese oxides (see see published US patent application 20110001095), and aluminum and magnesium oxides, etc and also see Ellmer, K. in Chapter 7 of the Handbook of Transparent conductors, Edited by Ginley, D. S., Springer, N.Y. 2010). The dopant concentration in zinc oxide (atomic, based on metal cations) is usually around or below 10%. Use of two dopants results in more durable zinc oxide based transparent conductors. Use of different composition of transparent conductors in the same device can be used in any chromogenic device, but it is particularly useful for forming low-cost window devices shown in FIG. 1*c*, as significant cost in a device is the TCs. The device in FIG. 1*c* is formed using several layers of thin solid films on a single substrate. As an example, one can start with a substrate that is already coated with a low cost transparent conductor (11*c*) of first composition. A low-cost TC deposited on a sheet glass forming float line is FTO on glass is available and can be used for windows. This TC has a surface resistivity in the range of 5 to 20 ohms/square (e.g., TEC7 or TEC15 from Pilkington, Toledo, Ohio; Certincoat® low haze TCO glass from Arkema located in Philadelphia, Pa.). After deposition of the other layers that form the EC device where this deposition is carried out by physical vapor deposition, chemical vapor deposition or wet chemical deposition, or a combination), the final TC layer 21c can be the low cost zinc oxide doped with at least two other metal oxides. This is because ITO is expensive, and FTO with high conductivity is difficult to deposit at reasonable temperatures. Unlike in $3^{rd}$ surface mirrors, for windows, the layer 21c should also have high conductivity, e.g., surface resistance in the range of 2 to 20 ohms/square. When physical vapor deposition is used to deposit TC's, then one may use General Plasma's (Tucson, Ariz.) Mov-Mag™ sputtering technology which results in higher conductivity and better target utilization when depositing transparent conductive oxide coatings.

Figure 1D:
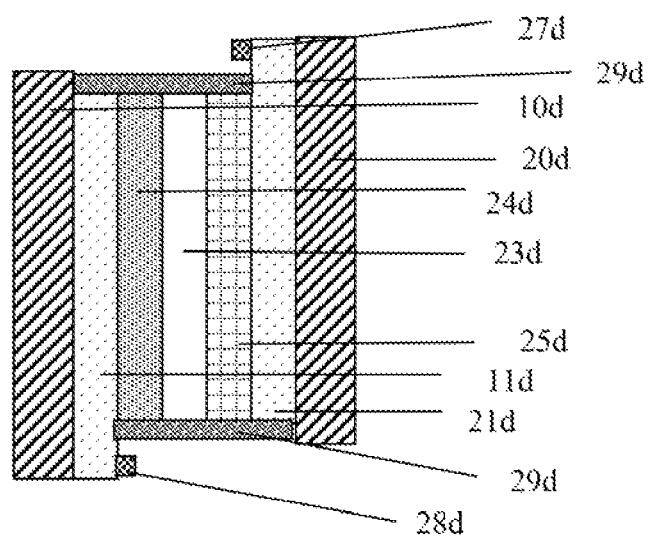
FIG. 1d: Schematics of an electrochromic device.

Transparent conductors that comprise of several layers such as dielectric/,metal/dielectric stacks may also be used in EC devices. These are collectively called DMD stacks. One may repeat this configuration, e.g., DMDMD (called double stack) or triple stack, etc. Use of DMD stacks (also called as IMI stacks in the literature) have been suggested in many U.S. patents such as U.S. Pat. Nos. 5,239,406; 5,523,877; 5,724, 187; 5,818,625; and 5,864,419 and more recently in published US patent applications 20110080629 and 2007/0206263. These published patent applications are included herein by reference in terms of the material compositions, processing, physical characteristics and properties required (e.g., optical, electrical, electrochemical, chemical and physical), and methods to establish these. Further, the use of these types of transparent conductors and their use in mirrors, particularly as the transparent conductor on the front surface (deposited on surface 2, i.e., substituted for 21 in FIG. 1a) is also included from these patent applications. These types of transparent conductors may be used in any type of EC devices as shown in FIGS. 1a, 1c and 1d. All of the materials described in these publications may be used, but some of the other materials described below will result in enhanced durability. However, it is highly preferred that the dielectric layer selected to be in contact with the other layers of the EC device (electrolyte or electrochromic electrode or a counterelectrode, etc) should have at least some electronic conductivity (preferably specific resistivity of less than $10^{-7}$ Ω/cm, and more preferably less than $10^{-5}$ Ω/cm). Preferred materials for these are stable and conductive metal oxides and a list of these is provided later. The dielectric layer which is only in contact with the substrate may be non-conductive. Typically from an optical perspective one needs to select and optimize the thickness of the dielectric layer, refractive index, electrical properties, and the metal type and its thickness to get a good combination of high optical transmission, high electrical conductivity and durability. When using these in devices one also needs to consider the optical properties (e.g., refractive index) of the medium that this stack will contact in the device. Such stacks also have low emissivity properties (emissivity lower than about 0.3 and preferably lower than 0.2) which are particularly useful for windows made using the construction in FIG. 1c, where such conductors are used instead of layer 21c. It has been shown that to have good corrosion resistance the grain size of the metallic layer is reduced and/or the composition of the layers should be such that it results in high corrosion resistance. Those stacks are also preferred with high visible transmission (greater than 50% photopic or at 550 nm, preferably greater than 70% transmission) and high conductivity (surface resistivity lower than about 10Ω/square).

For the metal layer, some of the preferred materials provide high corrosion resistance, and in these the grain size is typically less than the coating thickness, and preferably less than 10 nm. This is described in U.S. Pat. No. 7,425,255 which is incorporated herein in its entirety by reference. Some of the preferred alloy compositions are W—Ni, Ni—Mo, Co—W, Ni—P, Ni—W—B, Fe—P, Co—Mo, Co—P, Co—Zn, Fe—W, Cu—Ag, Au—Ag, Pt—Ag, Cu—Au—Ag, Cu—Pt—Ag, Pt—Au—Ag, Co—Ni—P etc. Fe—Mo, Co—W, Cr—P. The typical layer thickness for the metals is in the range of about 5 to 25 nm. Use of some made out of these multilayer stack coatings, some of the metals can result in coloration of these stacks. This coloration is acceptable in many of the products that may be used for architectural or some of the transportation glazings, for automotive mirrors non-colored transparent conductors are preferred. For colored transparent conductors, it is preferred that their color measured in transmission on a L*a*b* scale, that L* values be greater than 75 and a* values ±20 and b* values be within ±40. The metallic layer may comprise of more than one layer with different compositions. Corrosion resistant silver based alloys are disclosed in US published patent application 20100002282, which are included herein by reference. Typically, these silver alloys comprise several metal combinations but usually comprise of at least one or more selected from noble elements (i.e. Ru, Rh, Au, Pt and Pd) and rare earth elements (La, Ce, Nd, Sm, Eu). Some of the preferred alloying rare earth elements are samarium and neodymium. With samarium, additional alloying elements may be used and some of the preferred elements are copper, and optionally titanium and manganese may be added. One may also use aluminum alloys in particularly aluminum alloyed with at least one of Mg, Mn, Fe, Cu, Zn, Ni, Cr and Si is preferred (e.g. see U.S. Pat. No. 6,432,545). One may use two metal layers next to one another or two dielectric layers next to each other, where each metal or the dielectric layer next to each other has a different composition, e.g., silver alloy and aluminum alloy layers next to each other. Copper and copper alloys may also be used. Some of the preferred alloying elements with copper are one or more of Zn, Sn, Al, Si and Ni. This also includes brass formulations. Some of the other metals that may be used for the metal layer which have high stability are Ti, Nb, Ru, Rh, Au and Pt In addition the dielectric layers may comprise of more stable and impermeable materials, e.g., materials with than two metal oxides or more than one metal nitride, metal oxynitrides, metal carbides and borides. An example of conductive oxide is zinc oxide with more than one dopant such as aluminum and gallium oxides or gallium and manganese oxides. Other stable and preferred oxides are indium tin oxide, indium zinc oxide and antimony doped tin oxide. Metal oxynitrides include, but are not limited to, aluminum oxynitride, silicon oxynitride, boron oxynitride, and combinations thereof. Metal oxyborides include, but are not limited to, zirconium oxyboride, titanium oxyboride, and combinations thereof. Metal nitrides and other compounds include, but are not limited to, silicon nitride, aluminum nitride, zirconium nitride, titanium nitride, hafnium nitride, tantalum nitride, niobium nitride, tungsten disilicide, titanium diboride, and zirconium diboride, and combinations thereof. The refractive index of the dielectric materials should preferably be greater than 1.7.

Embodiment 4

Reduced Electrolyte/Reduced Environmental Impact Devices

Commercial EC mirrors use solid or liquid electrolytes. Typically these mirrors are made by sealing the perimeter of two conductive substrates, one of which is transparent. Typically the sealant has spacer beads to allow a fixed distance between the two substrates forming a cavity. Alternatively, spacer beads may also be sprinkled on one of the substrates prior to assembly. Generally, a small gap is left in the sealant so that after it is cured or solidified, electrolyte in a liquid form is introduced through this hole by backfilling and then it is sealed by another resin, typically radiation (UV) cured sealant. The cavity between these substrates is filled by an electrolyte (liquid or solid). Thinner gaps for electrolytes allow one to reduce the electrolyte consumption which typically comprises of several chemicals (e.g., solvents, salts, electrochromic dyes, UV stabilizers, residual monomers and initiators, etc.) and some of them could be toxic in larger amounts. In addition, one may reduce the environmental footprint by recycling components and using materials that are made by using reduced or renewable resources.

For mirrors one may use reflectors that are coated on fourth or third surface. The surfaces are numbered from the viewing side of the transparent substrate as "1" being the outside surface, 2 being the inner surface facing the cavity of the first substrate and the front of the second substrate facing in the cavity being third and the exterior surface of the second substrate being the fourth surface. Automotive EC mirror devices including materials used, and incorporation of displays in third surface mirrors are given in many patents, some of the exemplary ones included herein by reference are U.S. Pat. Nos. 7,300,166; 4,902,108; 5,140,455; 5,239,405; 5,500,760; 5,724,187; 6,002,511; 6,245,262; 6,870,656; 7,009,751. One may also use electrolyte lamination processes where the perimeter seal is dispensed (and may be partially cured), electrolyte dispensed in exact or in excess quantity in a pattern to fill the cavity when the second substrate is lowered. Most of the commercial EC mirrors have cavity thicknesses in the range of about 85 µm to about 300 µm depending on the electrolyte composition, size, etc. For example exterior mirrors are large and have cavity thicknesses on the order of 150 µm or more and the interior mirrors are generally 85 µm or more. This is because of the self erasing nature of these devices (i.e., the mirrors bleach when the power is removed), there is always current consumed in the colored state (leakage current). Thus the depth of coloration is compromised with increasing leakage current as that causes increasing voltage drop, which is the case when the cell gap (cavity thickness) is decreased for a given formulation. Generally the width of the cavity between the closest busbars (see "w" in FIG. 1a) is an important measure related to the cavity thickness. This is because for the same cavity thickness with increasing "w" the back reaction (and a given surface resistivity of the transparent conductor) will increase and at some point the voltage drop across the cavity becomes high enough that the devices do not color uniformly. Depending on the shape of the device "w" may vary; typically "w" for automotive interior mirrors rarely exceeds about 70 mm and is always more than 40 mm. Generally the transparent conductor conductivity of the commercial mirrors and window devices available today varies from about 6-20Ω/square, where a typical range for interior mirrors is about 12-20Ω/square and for exterior mirrors about 10-15Ω/square and for windows (car, architectural, aircraft, etc) usually between 6 and 10Ω/square. The resistivity decreases (conductivity increases) with increasing window size or "w". This is because with increased size, leakage current increases, which then results in increased voltage drop, and to reduce the effects of voltage drop (shallow or non-uniform coloration), the transparent conductors are made more conductive. In doing this, the cost of the transparent conductive coatings increase which impacts the product price and may also adversely impact bleach state transmission. EC device may be made in any thickness, such as U.S. Pat. Nos. 6,245,262 and 5,500,760 suggest EC devices for a variety of uses in a thickness range of 10 to 1,000 µm but do not provide any data on automotive mirrors fabricated less than 37 µm. It is interesting to note that there are a few examples in these patents where interior mirrors have been made in a cell thickness range of 37 to 50 µm. It is possible to make smaller self-erasing EC devices for other applications that have different requirements using electrolytes that are used in commercial automotive EC mirrors. However, for interior mirrors there were two things that were out of place, either these were liquid and a very high conductance transparent conductor with a surface resistance of 6-8Ω/square was used or these were solid with high polymer contents to limit the mobility of the electroactive species, e.g. EC dyes (to reduce back current). The polymer content was typically very high, more than 30% (only one mirror had about 22%). The polymer content is based on the weight % of the monomers used in the electrolyte. When such high concentrations of monomers are used, they result in high shrinkage due to polymerization and result in poor durability. This is true where low viscosity liquid monomers are filled in cavities (usually by back filling), and then cured to convert them to solid. In all commercial mirrors to avoid shrinkage issues the polymer content of the electrolyte is limited to less than 15% and usually much lower than 10%. When this is done, then the mirror cavity thickness for interior mirrors typically is in the range of about 88 to 135 µm similar to the liquid mirrors. Similar argument is made for exterior mirrors, where commercially economic mirrors are made in a cell thickness range of 150 to 250 µm. Again some of the exterior mirrors in U.S. Pat. No. 6,245,262 with cavity thickness of less than 100 µm had a polymer content in excess of 40%. In this patent and in U.S. Pat. No. 5,928,972, both from the commercial supplier of mirrors all formulations with lower polymer content had cell gaps which are not too different from liquid cells. Both of the above patents are incorporated herein by reference. At present more than 10 million EC mirrors are made and they were commercially introduced about two decades back, and there are several hundred patents specifically on mirrors, however, the cell gap of these mirrors has remained almost unchanged or has been increased.

U.S. Pat. Nos. 6,853,472 and 6,961,168; 7,300,166 discuss the use of ionic liquids in the electrolytes, however it was only discovered by surprise in this disclosure that when such electrolytes with the right combination of dye concentrations are used one can fabricate thin devices that meet all of the optical, electrical and the durability characteristics comparable to any of the commercial devices. One could make automotive mirrors that were thinner than 37 µm. Further mirrors with liquid electrolytes or polymer contents lower than 10% can be made in this thickness range. In addition, interior mirrors can be made in thickness range of less than 50 µm using transparent conductors with a resistivity of equal to or greater than about 12 µs/square, exterior mirrors with 100 µm or less cell gaps with transparent conductor resistivity equal to or greater than about 10Ω/square. For third surface mirrors, these numbers refer to the conductivity of the transparent conductor on the front surface. Liquid crystal mirrors can be fabricated using thin cavities in cells, but it has not been demonstrated for electrochromic mirror cells for automotive and other transportation applications. When the electrolyte thickness is reduced, it increases the leakage current (or the back reaction), or the steady current consumed in the colored state. This causes the mirror to color non-uniformly where it is darker near the edge busbars and lighter towards the center. To combat this effect one may use all or one of three remedies, either use higher conductivity transparent conductor so that the leakage current does not lead to appreciative voltage drop or reduce the leakage current by increasing the ionic concentration in the electrolyte or increase the electrolyte viscosity which also reduces the dye transport in the electrolyte. For interior mirror cells less than 50 µm in thickness and to attain reflectivity lower than 15% (preferably lower than 10%) we have found that an increase in ionic concentration is quite effective without any other non-desirable property changes and with a minimum impact on the cost. The ionic concentration of the electrolyte is dependent on the concentration of the materials in the electrolyte that have salt like structure, i.e. have anions and cations. These could be EC dyes and inert salts including ionic liquids. The concentration of the electrochromic dye for low leakage current devices should be greater than about 0.06M. If a pair of dyes is used, i.e., cathodic and anodic, then the total concentration of each dye should be greater than 0.06M. To attain low leakage current in lower electrolyte thickness cells, the total concentration of the ionic species should be preferably greater than 1M and more preferably greater than 1.4M and most preferably greater than 2M. Unless there is a substantial decrease in the electrolyte thickness, the increase in cost of the thicker transparent conductor (i.e., lower surface resistivity) may offset the cost so that there may not be any net benefit in terms of total device cost. For mirrors where "w" is on the order of 100 to 200 mm (a typical dimension for some of the exterior EC mirrors), the same metrics of ionic concentration apply when the cells are thinner than about 125 µm and preferably less than 100 µm (typically the present commercial exterior mirror cells are 150 to 200 µm in electrolyte thickness). For EC windows (e.g. EC aircraft windows) where "w" may be much larger than 200 mm the electrolyte thickness of the cells may have to be increased, but can still be kept below 250 µm, preferably below 150 µm. Further use of ionic liquids in EC aircraft windows decreases the system flammability.

One purpose of this invention is to enable technologies to reduce the electrolyte content by decreasing its thickness at an attractive cost. Lowering of electrolyte content reduces cost. Lowering of the electrolyte thickness also improves the optical quality of the image by reducing the separation between multiple images. The preferred thickness of electrolyte in interior automotive mirrors of this invention are less than about 35 µm and preferably less than about 30 µm, and most preferably less than 20 µm. However, any conductivity may be used if the product is superior and meets the customer cost requirements. For third surface mirrors, as indicated in the above references, the conductivity of the reflective surfaces (also used as conductors) is high and is typically less than about 2Ω/square, and generally less than about 0.1Ω/square. If the metal reflectors are covered by a transparent conductor on the third surface, then the conductivity of such conductors is usually within the range of 10 to 10,000Ω/square and its material composition may be different from the material composition of the transparent conductor on the first substrate. In order to suppress colors emanating due to the interference from reflections coming from the TC and the underlying reflector, a preferred thickness of the TC on the third surface is such that produces either a retardation of $\lambda/4$ or $\lambda/2$ or multiples thereof by adding $\lambda/2$. For visual performance, typically $\lambda$ is taken as the dominant scotopic or photopic wavelengths which are 500 nm and 550 nm respectively.

Since these mirrors are used for automotive purposes, the preferred reflectivity range for interior mirrors should be greater than 70% and less than 10% (photopic or at 550 nm). For exterior mirrors one should achieve reflectivity greater than 45% and less than 15%. Preferred voltage required to color these should be less than 1.5V. As long as it is acceptable by the authorities in the region where such mirrors are used, other reflectivity ranges may also be used. In addition, these mirrors must also pass other criteria of low and high temperature performance, thermal shock and humidity resistance, seal durability, UV and cyclic durability as required by various car manufacturers and their product specifications.

Use of ionic liquids in electrolytes of EC devices is not new (e.g. see U.S. Pat. Nos. 7,064,212; 6,853,472; 6,961,168; 7,300,166), preferred ionic liquids, dyes and other additives (including those that result in solid electrolytes) for mirrors are provided in these patents which are included herein by reference. We were surprised to see that the use of ionic liquids and appropriate dye concentration in the electrolyte allowed us to fabricate mirror devices which colored uniformly and had extremely low cell gaps. A preferred dye concentration is typically greater than 0.05M, and preferably greater than 0.06M (if a redox dye pair is used, i.e., separate anodic and cathodic dyes, then the concentration of either type should be preferably greater than 0.06M). Further, these devices could be fabricated by using transparent conductors (e.g., indium tin oxide or fluorine doped tin oxide) which were about 12Ω/square, although any suitable TC conductivity may be used. These devices increased environmental benefits but also reduced cost by using readily available substrates and reducing electrolyte consumption. Typical substrate thickness is between 0.9 and 2.4 mm for mirrors. Further, the thickness of the two substrates forming a cavity may be different. It is preferred that the anion of the dye be the same as that of the ionic liquid that is used. Some of the preferred fluorine containing anions for ionic liquids and the dyes are triflate ($CF_3SO_3^-$), imide ($N(CF_3SO_2)_2^-$), beti (($C_2F_5SO_2)_2N^-$), methide ($CF_3SO_2)_3C^-$), tetrafluoroborate ($BF_4^-$), hexafluorophosphate ($PF_6^-$), hexafluoroantimonate ($SbF_6^-$), hexafluoroarsenate ($AsF_6^-$) and tris pentafluoroethyl-trifluoro phosphate (FAP i.e., $PF_3 (C_2F_5)_3$). Non fluorine containing anions, for example alkyl sulfate (e.g. $C_2H_5SO_4^-$) and tetracyanoborate may also be used. Devices with hydrophobic ionic liquids are preferred, as these may also be processed under less stringent inert conditions and provide superior durability. The preferred quaternary ammonium cations for ionic liquids include, but are not limited to, pyridinium, pyrrolidinium, pyridazinium, pyrimidinium, pyrazinium, imidazolium, pyrazolium, thiazolium, oxazolium, and triazolium. These can have various substitutions or substituents, such as H, F, phenyl and alkyl groups with 1 to 15 carbon atoms. Rings may even be bridged. Theses cations along with imide ($N(CF_3SO_2)_2^-$), beti (($C_2F_5SO_2)_2N$), methide ($CF_3SO_2)_3C^-$), and tetracyanoborate and FAP result in hydrophobic ionic liquids. The electrochromic dyes used should preferably have the same anions as that of at least one of the ionic liquids in the electrolyte. Since preferred electrolytes comprise of hydrophobic ionic liquids, preferred hydrophobic dyes have anions selected from one of imide ($N(CF_3SO_2)_2^-$), beti (($C_2F_5SO_2)_2N$), methide ($CF_3SO_2)_3C^-$), and tetracyanoborate and FAP. Although the preferred dyes are described in the references and used in the examples, typically these are viologen salts including those dyes where the viologens have been combined with anodic species such as with metallocenes (e.g., ferrocene) and phenazines. Other than the dyes, other additives may be used for the electrolyte. Some examples are non-ionic solvents e.g., propylene carbonate, ethylenecarbonate, phosphates, esters, sulfolane, additives such as UV stabilizers and viscosity modifiers or monomers (along with suitable co-reactants and catalysts) and polymers that will result in solidification of the electrolyte by reaction or by cooling. All these are given in extensive details within the references included herein. Further, inclusion of ionic liquids in the electrolyte impart flame retardant properties as they are difficult to ignite due to almost non-existent vapor pressure, which is particularly useful for transportation, and specifically windows on military vehicles and aircrafts.

Figure 3D:
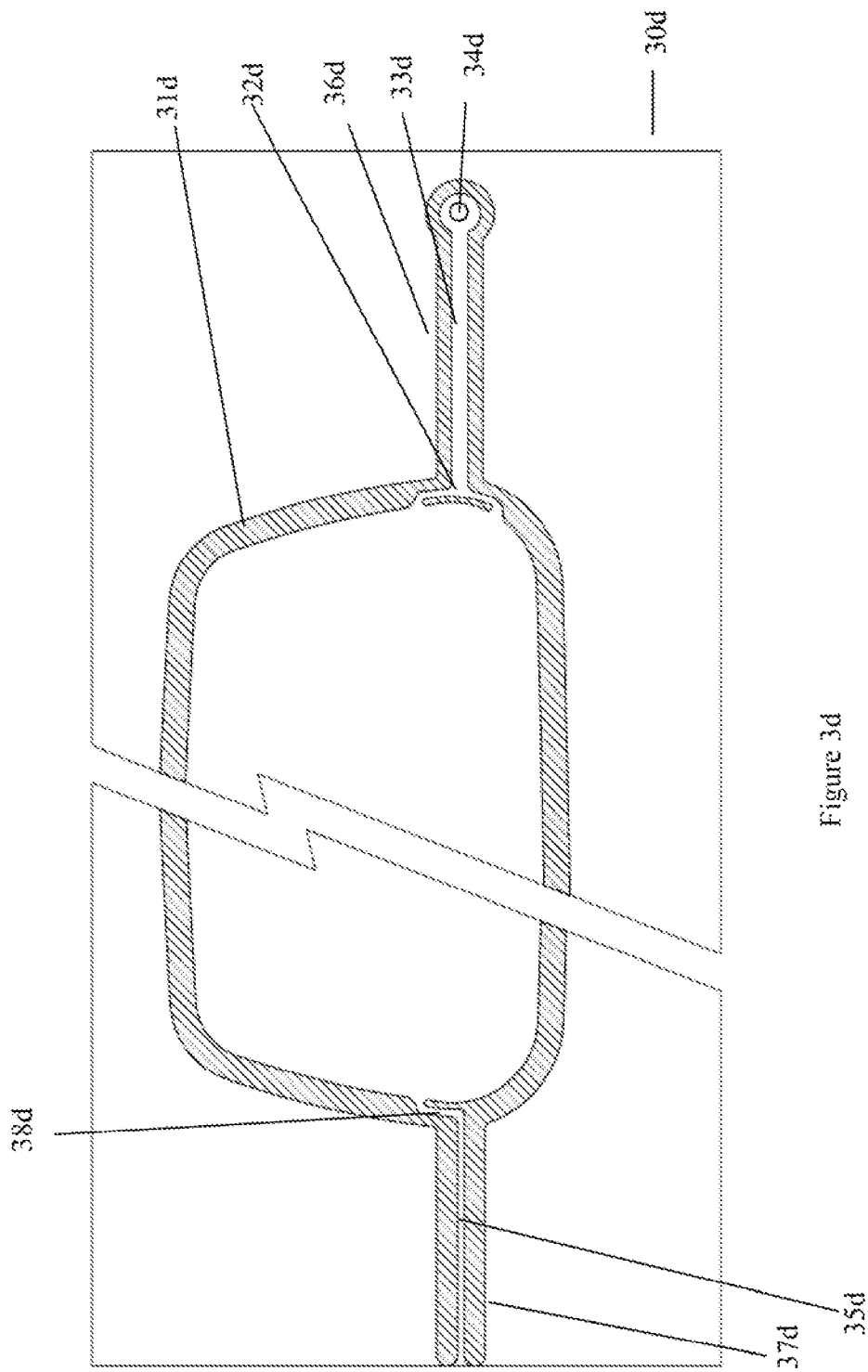
FIG. 3d: Drawing showing the perimeter sealant and the dam geometry for inlet openings for electrolyte fill port and the gas exit port.

Processing of these EC devices can be done using methods similar to those in the liquid crystal industry and make use of the automation that is available. The perimeter adhesive may be dispensed by a variety of methods such as using dispensers or screen printing on one of the two substrates. Since the cavity thickness is small one may also deposit small dots of the adhesive with spacers in several interior areas of the cavity that will help in keeping substrates equally spaced throughout. These areas should preferably be smaller than 0.25 sq mm, and more preferably smaller than 0.04 sq mm in cross section so that these are not easily visible. In addition to these dots a perimeter adhesive is also dispensed. The two substrates are then brought together and the perimeter adhesive is cured. The adhesive should preferably be light in color or colorless, although optionally dark colored adhesives may be used. If these adhesive dots, in the interior of the device are dispensed separate from the perimeter sealant, then these dots are made preferably of clear adhesive, and are cured before the main sealant is dispensed. These dots should preferably be UV cured and should be in a height of about 95% or lower as compared to the cured height of the perimeter sealant. Further, it is preferred that their mechanical modulus after curing should be less than that of the perimeter sealant and a preferred modulus range is about 1,000 to 200,000 psi. These measures ensure that when the perimeter sealant bonds the two substrates there is little or no stress on the perimeter bond due to the compression (if any) of these interior dots. One method of dispensing sealant dots in areas smaller than 100 µm×100 µm is by using a microdispenser or a localized spray process. Preferably as described earlier by maskless mesoscale materials deposition process (M³D™) by Optomec Corporation (Albuquerque, N. Mex.). A hole may be left in the perimeter sealant which is used for backfilling the electrolyte in the cavity (or chamber) formed by the two substrates and separated by spacers and/or the perimeter sealant. After filling, the hole is plugged with a UV curing resin (plug seal). As is commonly know in the art, the plug seal materials for EC devices are the same that can be found for sealing the liquid crystal devices. This is recognized in US patent application 2009/0002803 for EC devices where several references to sealants for liquid crystal devices are given, however references to other sealants in liquid crystal devices that use epoxies cured by antimonates (e.g., see PCT patent application WO/2003/011939) is not provided. One may also use a seal bar or a dam made out of the perimeter sealant to offer resistance to the plug seal material so that it does not easily penetrate into the interior of the cell (e.g., see U.S. Pat. No. 6,473,148 for liquid crystal devices). It is very surprising that although this concept has been known in the liquid crystal industry, it has never been used in EC devices, although these devices have been used for commercial mirrors for two decades and the EC mirror manufacturers being very familiar with liquid crystal encapsulation techniques. The shape of the seal bar can be any and preferably its width is about 2 mm or less (preferably 1 mm or less) and its shape generally corresponds to the mirror curvature in the area of the plug and its length is greater than about 3 mm, preferably greater than 6 mm and its height is the same as the perimeter sealant. This bar may even be connected to the main seal and may have gaps for the electrolyte to flow through. The important issue is to provide increased resistance for the plug material to flow into the cell cavity, i.e. it reduces the direct access of material entering the plug hole area to the interior. This bar is a novel idea for EC mirrors and windows as it increases the process yield by reducing the rejects caused by the migration of the plug material far into the device before it cures. It is also possible that some of the components in the plug sealant may be more mobile. This is true regardless of the nature of the plug sealant and its compatibility with the electrolyte. FIG. 3 shows an interior EC car mirror incorporating such a bar. The substrate 30 is shown with a perimeter seal 33 with a gap 32 left for electrolyte introduction. Also shown is the bar 31 which would offer resistance to the plug sealant from migrating into the cell (in a commercial EC mirror the bar would be absent). The bar is preferably deposited along with the perimeter sealant and is made of the same material and has similar height. When the second substrate is lowered and the two substrates (empty cavity) bonded by this perimeter sealant, the bar also touches both the substrates and is also cured. After filling the cell with an electrolytic composition, the electrolytic composition may be solidified by cooling or polymerization. FIGS. 3b and 3c show magnified views of a few more examples of alternative concepts of the bar or dams that may be used to restrict the flow of material from the plug area into the cavity These figures show part of the perimeter seal (33b and 33c) and the dam (31b and 31c) construction along with the gap (32b and 32c) for the electrolyte introduction. For injection filling where there are multiple ports (usually two) in the perimeter seal of the cavity (usually at the two opposite or diagonal ends, both of these ports can have a dam like structure. The filling by injection of one or more cavities is more fully discussed in U.S. Pat. No. 7,457,027 and published US patent application 2009/0095408, both of these are incorporated herein by reference. The dam like structure creates a more tortuous path into the cavity as compared to a break in the perimeter sealant which allows a straight and unobstructed path from this opening into the cavity (e.g., see opening 13 in FIG. 1a of U.S. Pat. No. 7,457,027, which does not make use of a dam structure, i.e., there is no further obstruction to the flow of a liquid into the cavity once it gets past this opening, which is also the case for the opening shown as 15 in FIG. 1b of this referenced patent, after the tab is removed along with the filling channel and the fill port). The dam structure can increase the resistance to the fluid flow during the filling of the cavity with the electrooptic medium, but importantly, it prevents or obstructs easy entry of the port (or plug) sealant into the interior of the cavity and interfere with the electrooptical effects of the device. Such plug sealant is applied as a liquid or a paste after filling the cavity with an electrooptic medium. Once the port or the plug sealant is applied, it is cured or hardened by the application of a stimulus, typically UV light. The dam structure and injection filling of one or more cavities has been discussed more fully in published US patent application 2009/0095408. However, the pattern or geometry for the two (or more) ports in the same cavity may be different. The fill port may have wider gap between the dam and the seal to allow the electrooptic fluid to enter more easily during the filling operation, and the other port for gas vent may have smaller opening. When these cells are filled using automated filler, the increased resistance to the electrolyte (or the electrooptic fluid) flow through the second port can be used as a filling end point determination method. A plan view of an EC mirror showing the geometry of an automotive EC mirror is shown as schematics in FIG. 3d (for more detailed description of filling published US patent application 2009/0095408, and particularly the FIGS. 3a, 3b, 4, 5a and 5b and the descriptions in this referenced application are useful). FIG. 3d in the present disclosure shows two substrates 30d in plan view (where the top substrate is transparent) which are glued using a perimeter adhesive in a pattern as shown by 31d (the two substrates are not shown as different entities, as they are of the same shape and size and completely overlap each other). Typically spacers are dispensed in the sealant or/and in the interior area to form a cavity which has similar thickness as the spacers. This perimeter adhesive shows a channel formation 33d which is used to fill the cavity. The cavity is filled using a fill hole, where such a hole is formed in one of the substrates as shown by 34d. When the electrolyte is filled, it passes through the channel, past the dam shown as 32d and fills the cavity. The gas (air or any other inert gas used in the cavity escapes through the opening in the second dam 38d and through the channel 35d. When the cavity is filled a sudden resistance to flow is seen once the electrolyte reaches the second dam 38d, and particularly so if its size or opening is small, and/or if the size of the channel 35d is also small. If automated filling is used, such an increase in resistance (decreased flow, or increased pressure to maintain a certain flow rate) can be taken as an end point. Once the cavity is filled, both the substrates may be scribed close to the outside of the perimeter sealant of the cavity, and the filled cavity is removed. The cuts are made so that these pass close to the two dams but the outer perimeter of the adhesive so that the channels formed by the sealant 36d and 37d are also removed. The two port holes are then plugged with a liquid or a pasty adhesive (plug adhesive), and the adhesive is then cured (e.g., by UV). The advantage of the dams is that the plug adhesive is unable to easily permeate into the cavity and create a defect. As a barrier to the plug adhesive, one may even leave a part of the channel (e.g., 36d and 37d), which can also act as a barrier for the plug adhesive. As discussed in US patent application 2009/0095408, it is preferred to create several cavities by dispensing the perimeter adhesive between two large substrates and then remove all of the filled cavities after cutting the substrates.

One may also dispense the sealant and then dispense the electrolyte before curing the sealant. The perimeter sealant is dispensed on one or both of the substrates, and then partially cured or its viscosity increased, and then the electrolyte is dispensed on one of the substrates towards the center of the cell, which flows out and fills the cavity as the top substrate is lowered and presses the electrolyte, or it may also overflow, i.e., the adhesion of the sealant and the substrate is not impaired even though the electrolyte had touched the area where the perimeter sealant would bond to. The sealant is then cured. This can eliminate the need for a plug seal. As an example U.S. Pat. No. 4,761,061 describes this type of process to fabricate EC devices. In this case it is preferred to have an electrolyte which does not interact with the sealant. Use of hydrophobic ionic liquids in the electrolyte will not interact with most epoxy based sealants that are routinely used in the liquid crystal (LC) industry. Examples of some of the materials and process for sealants in the LC industry can be found in U.S. Pat. Nos. 7,101,596 and 7,292,306. A variety of plug sealants can be used e.g., see examples in U.S. Pat. No. 6,327,069, or those available commercially from Dymax (Torrington, Conn.) and Loctite brand from Henkel (Rocky Hill, Conn.).

The environmentally friendly mirror assemblies are those where the mirror cell cavity formed by two substrates is less than 50 µm in electrolyte thickness and are substantially free of one or more of lead, mercury, cadmium, beryllium, hexavalent chromium and brominated flame retardants. Most preferably the cells are less than 40 µm in thickness and are substantially free of all lead, mercury, cadmium, beryllium, hexavalent chromium and brominated flame retardants. The mirror assemblies comprise of housing including supporting arm, electronics and any other components located within the mirror housings.

To reduce the environmental footprint of the automotive mirrors, particularly in EC mirrors, one may also use recycled materials for the housing of the mirrors and other plastic components, such as the bezel, etc. Typically, the recycled content should be greater than 5% and may even be 100%. Typical thermoplastic polymers that are available as recycled materials are high density polyethylene (HDPE), polypropylene (PP), high impact polystyrene (HIPS), acrylonitirile, butadiene and styrene copolymer (ABS), thermoplastic elastomers (both urethane and olefin based), polycarbonate (PC), polycarbonate blended with ABS, and polyethylene terephthalate (PET). Typically current mirror housings are made of polypropylene or ABS, the bezels may be made of the same material or of other materials such as thermoplastic elastomers (polyolefin or urethanes) and many of the brackets inside the mirror may be made of engineering plastics such as nylon or lenses from acrylic and polycarbonate. Use of the same plastics over and over again and recycling many times may lead to deterioration of its properties. Thus these plastics may be marked with a universal symbol to show recycled content or the number of times it may have been recycled. Another way of decreasing the environmental footprint is to use polymers produced from renewable resources. Typically these materials use less energy to produce as compared to those from petrochemical feedstocks. To produce polyurethanes one may use polyols prepared from soyabeans or make use of polymers from polyhydroxyalkanates. A polyol produced from renewable sources is available from Cargill (Minneapolis, Minn.) as BiOH™. This polyol may also be used in solidification of electrolytes by polymerization for EC devices (see U.S. Pat. Nos. 6,245,262; 5,679,283 and 7,300, 166). Dupont (Wilmington, Del.) supplies Sorona® and Hytrel®. Castor oil based intermediates have been incorporated in nylons from BASF (Ludwigschafen, Germany), e.g. in Nylon 610; and Arkena (Colombes Cedex, France) supplies Nylon 11 and ReBax Renew. Some of the materials inside the housings that do not come in contact with the environment may also be made biodegradable so they degrade when subjected to a landfill. Further, one may mark the components of the mirrors, such as glass, EC cell, electronics and other key components so that depending on their age and condition these parts may be salvaged and re-used.

Example 1

Preparation and Characterization of Solid Electrolyte

A solid electrochromic electrolyte (E1) was prepared by combining under nitrogen 1.0 g of a copolymer of vinylidene fluoride and hexafluoropropylene, supplied by Solvay (Thorofare, N.J.) under the trade name Solef 20615/1001, with 10 ml of propylene carbonate while stirring at 130° C. for one hour. The mixture was cooled to room temperature and 0.3834 g (0.039 molar solution) of the electrochromic dye Fc-Vio imide (1-(4-ferrocenylbutyl)-1-methyl-4-bipridinium and 1,1,1-trifluoro-N-[(trifluoromethyl) sulfonyl]- methanesulfonamide salt) added under nitrogen atmosphere. Fc-Vio imide is a dye which has an anodic moiety (ferrocene) which is covalently linked to a cathodic moiety (viologen cation) and the anion is imide. The mixture was heated to 100° C. for one hour while stirring to form a complete solution. The electrolyte was degassed under vacuum for 10 minutes at 100° C. and when cooled to room temperature was a solid material. The viscosity of the electrolyte was measured using a Brookfield Digital Rheometer with a cone and plate attachment and temperature control to within 0.5° C. The results are shown in the following table:

| Temp ° C. | Viscosity (cP) |
|---|---|
| 70 | 482 |
| 80 | 412 |
| 90 | 343 |
| 100 | 294 |
| 110 | 251 |
| 120 | 218 |

From the viscosity data, the glass transition temperature (Tg) of the electrolyte was calculated to be −70° C. The electrolyte had a solid to liquid temperature ($T_M$) of 82° C. as visually observed by leaving a sealed bottle of the electrolyte in the oven and perturbing the bottle. The viscosities were measured at elevated temperatures and then the electrolyte is cooled and measured periodically. The viscosities can be measured at lower than the melting points due to a supercooling effect, where it takes a long time for the material to solidify by crystallization or the temperature has to be lowered significantly before crystallization kicks in. Once solidified, the material has to be heated to higher temperatures than the solidification point for melting to take place.

Example 2

Preparation and Characterization of Solid Electrolyte E2

A solid electrolyte was prepared as described in example 1 above except the concentration of the polymer Solef 20615/1001 was increased from 1.0 to 1.43 g (from 7.6 to 10.5 wt. %). The viscosity of the electrolyte was determined as described in example 1 and it had the following viscosity as a function of temperature:

| Temp ° C. | Viscosity (cP) |
|---|---|
| 70 | 2527 |
| 80 | 1976 |
| 90 | 1572 |
| 100 | 975 |
| 110 | 768 |
| 120 | 622 |

From the viscosity data the glass transition temperature (Tg) of the electrolyte was calculated to be −95° C. The electrolyte had a solid to liquid temperature ($T_M$) of 82° C. from visual inspection in an oven as described above.

The thermal stability of the electrolyte was tested by repeated cycles between 25 and 130° C. with no change in the color or physical properties of the electrolyte. The electrolyte was stored at −19° C. for three days and at 50° C. for twenty four hours with no change in physical properties.

Example 3

Preparation and Characterization of Solid Electrolyte E3

A solid electrolyte was prepared in a mixed solvent system by combining under nitrogen 1.0 g of Solef 20615/1001 with 9.5 ml of propylene carbonate and 0.5 ml of 1-butyl-1-methylpyrrolidinium salt with 1,1,1-trifluoro-N-[(trifluoromethyl) sulfonyl]-methanesulfonamide. This mixture was stirred at 130° C. for one hour to form a clear viscous liquid. The mixture was cooled to room temperature and 0.3227 g (0.03276 moles) of the electrochromic dye 1-(4-ferrocenyl-butyl)-1-methyl-4-bipridinium salt with 1,1,1-trifluoro-N-[(trifluoromethyl) sulfonyl]-methanesulfonamide was added under nitrogen atmosphere. The mixture was heated to 100° C. for one hour while stirring to form a complete solution. The electrolyte was degassed under vacuum for 10 minutes at 100° C. and when cooled to room temperature was a solid material. The viscosity data for the electrolyte determined as described in example 1 is shown below:

| Temp ° C. | Viscosity (cP) |
|---|---|
| 70 | 512 |
| 80 | 428 |
| 90 | 356 |
| 100 | 294 |
| 110 | 253 |
| 120 | 218 |

From the viscosity data the Tg of the electrolyte was calculated to be −65° C. The electrolyte had a solid to liquid temperature ($T_M$) of 84° C. Results from the differential scanning calorimeter indicated that depending on the thermal history, the melting point onset was about 60° C., with a peak at about 65 to 71° C. with melting completed at about 73 to 78° C. A maximum melting enthalpy of 2.9 J/g was measured.

Example 4

Preparation and Characterization of Solid Electrolyte E4

A solid electrolyte was prepared by combining under nitrogen 1.427 g of Solef 20615/1001 with 10 ml of propylene carbonate while stirring at 130° C. for one hour. The mixture was cooled to room temperature and 0.4186 g (0.055 moles) of an electrochromic dye where an anodic phenazine moiety was covalently linked to a viologen moiety (Ph-Vio $2BF_4^-$), was added under nitrogen atmosphere. The mixture was heated to 100° C. for one hour while stirring to form a complete solution. The electrolyte was degassed under vacuum for 10 minutes at 100° C. and when cooled to room temperature was a solid material. Details of the dye are given in the reference by Michaelis, A., et al, Advanced Materials, vol 13 (2001) p-1825.

Example 5

Preparation and Characterization of Solid Electrolyte E5

A solid electrolyte was prepared in a mixed solvent system by combining under nitrogen 1.427 g of Solef 20615/1001 with 9.5 ml of propylene carbonate and 0.5 ml of 1-butyl-1-methylpyrrolidinium salt with 1,1,1-trifluoro-N-[(trifluoromethyl) sulfonyl]-methanesulfonamide. This mixture was stirred at 130° C. for one hour to form a complete solution. The mixture was cooled to room temperature and 0.4186 g (0.055 moles) of the same dye as in electrolyte E4 was added under nitrogen. The mixture was heated to 100° C. for one hour while stirring to form a complete solution. The electrolyte was degassed under vacuum for 10 minutes at 100° C. and when cooled to room temperature was a solid material.

Example 6

Cell Fabrication and Cell Filling

Two pieces of 12Ω/sq. ITO were cut into 2"×2.5" sections. One piece was drilled with two fill holes at opposite ends of the long diagonal. Cells were made by applying an epoxy containing spherical glass spacers (spacer size, e.g., 125, 102 or 88 μm) to the perimeter of one of the ITO substrates. The second substrate was then placed on top of the epoxy coated ITO glass, in a position which was slightly off-set along the long side for busbar application (i.e., the busbar was applied on the short side). Clamps were applied to the assembly at the epoxy perimeter to ensure intimate contact as well as to ensure the cell spacing conformed to the spacer size in the epoxy. The epoxy seal was cured in an oven at 150° C. for one hour. They were then filled with electrolyte under a dry inert atmosphere by injecting the medium through one of the fill holes. Both the holes were subsequently plugged using a Teflon ball and sealed by a small glass plate (0.5 cm×0.5 cm and 1 mm in thickness) using a room temperature UV curing acrylic. The filling of cells was done at 100° C., where both the cell and the electrolyte were heated. Conductive metal clips (busbars) with soldered leads were placed on the two offset conductive edges. These formed the electrical contacts to each electrode.

Example 7

Cell Filling with Solid Electrolyte

A solid electrolyte was prepared with composition E3. This was used to fill two window cells prepared as described in example 6, one with a cell gap of 88 μm and the other 102 μm. The electrolyte and cell were heated to 100° C. to enable free flow of the electrolyte into the cell cavity. The color coordinates and percent haze of the cells were measured using an Ultra Scan XE Colorimeter in the total transmission mode. This data for the cells is shown in the following table:

| Cell Gap | X | Y | Z | % Haze |
|---|---|---|---|---|
| 88 μm | 75.41 | 81.74 | 78.62 | 0.05 |
| 102 μm | 74.90 | 81.14 | 78.21 | 0.06 |

Example 8

EC Properties of Window Devices

Electrolytes were prepared with composition E1 except that the electrochromic dye concentration was varied between 0.039 and 0.055M. These electrolytes were used to fill cells prepared as described in example 6 where the cell gap was 125 and 88 μm. The room temperature electrochromic properties of the cells were tested using a Shimadzu 3100 spectrometer at 550 nm by applying a color potential of 1.2V for 50 seconds and bleached by shorting the electrical wires from the two substrates. The electrochromic properties were as follows:

| Dye Concentration (molar) | Cell Gap (μm) | Bleached, % T (550 nm) 25° C. | Colored, % T (550 nm) 1.2 volts for 50 seconds at 25° C. |
|---|---|---|---|
| 0.039 | 125 | 83.0 | 10.5 |
| 0.040 | 125 | 82.5 | 8.4 |
| 0.044 | 125 | 82.5 | 6.4 |
| 0.050 | 125 | 82.3 | 5.3 |
| 0.055 | 125 | 82.4 | 3.9 |
| 0.039 | 88 | 84.7 | 18.4 |
| 0.040 | 88 | 84.9 | 18.0 |
| 0.044 | 88 | 84.2 | 14.5 |
| 0.050 | 88 | 84.3 | 11.8 |
| 0.055 | 88 | 84.3 | 10.6 |

The percent haze in the cells was determined for a cell gap of 125 μm as a function of dye concentration and is shown below:

| Dye Concentration (molar) | % Haze |
|---|---|
| 0.0320 | 0.05 |
| 0.0382 | 0.03 |
| 0.0440 | 0.07 |
| 0.0500 | 0.07 |
| 0.0550 | 0.08 |

Example 9

EC Properties of Window Devices

A cell prepared as described in example 6 with a gap of 125 μm was filled with an electrolyte E4. The electrochromic properties of the cell were determined at 25° C. using an Ocean Optics Spectrometer. In the bleach state (uncolored) the cell had a transmission at 550 nm of 66.8% and when colored at 1.0V for 20 seconds had a transmission of 3.2% with a leakage current (current when a steady state in colored state is reached) of 1.94 mA/cm$^2$.

Example 10

EC Properties of a Cell

A cell prepared as described in example 6 with a gap of 125 μm was filled with an electrolyte E5. The electrochromic properties of the cell was determined at 25° C. using an Ocean Optics Spectrometer. In the bleach state (uncolored) the cell had a transmission at 550 nm of 66.8% and when colored at 1.0 volts for 20 seconds had a transmission of 2.8% with a leakage current of 1.27 mA/cm$^2$.

Example 11

EC Properties of a Mirror

A fourth surface interior mirror cell was fabricated (about 6 cm×25 cm) with a cavity thickness of 63 μm with the transparent conductive coatings facing inside of the cavity. The substrates were slightly offset along the long direction to provide for busbar clips. The cavity was filled with an electrolyte E1 excepting that the dye concentration was 0.055M.

The cell was powered by applying a potential of 1.3V and bleached by shorting the two electrodes. The cell characteristics in percentage reflection (% R) and kinetics are shown below at 550 nm.

| % R, Bleached | % R, Colored | Time to Color 50% range | Time to Color 80% range | Time to bleach 50% range | Time to bleach 80% range |
|---|---|---|---|---|---|
| 82.4 | 14 | 0.9 sec | 2.0 sec | 1.3 sec | 1.8 sec |

Example 12

EC Properties of a Mirror

A mirror was fabricated by making a cell as in Example 6 with a cavity thickness of 125 μm and was then filled with the electrolyte E2 with the Fc-Vio imide dye in a concentration of 0.04M. A mirrored piece of glass was placed behind this window (sixth surface mirror) with a drop of water to reduce the reflective losses due to an air gap between the cell and the mirror. The cell was powered by applying a potential of 1.2V and bleached by shorting the two electrodes. The mirror assembly was powered by applying a potential of 1.3V and bleached by shorting the two electrodes. The cell characteristics in percentage reflection (% R) and kinetics are shown below at 550 nm.

| % R, Bleached | % R, Colored | Time to Color 50% range | Time to Color 80% range | Time to bleach 50% range | Time to bleach 80% range |
|---|---|---|---|---|---|
| 78.2 | 6.2 | 1.7 sec | 4.7 sec | 3.7 sec | 7.7 sec |

Example 13

Preparation and Characterization Cells with Electrolyte Gap of 30 μm

Mirror cavities were prepared using ITO coated glass (12 Ω/square) and one of the substrate had a protective silver coating on its rear surface (fourth surface mirror) and epoxy perimeter sealant with 30 micron spacers. The glass thickness was 2.3 mm. The spacers were supplied by Duke Scientific Corporation, Palo Alto, Calif. and had a certified mean diameter of 30.1 μm with an uncertainty of ±2.1 μm. The distance between the busbars was the same as in the standard EC interior rearview automotive mirror cell (for this mirror device "w" was 56 mm as shown in FIG. 1a). The cells had two fill holes at opposite corners of the glass top electrode for filling with electrolyte. The sealant in the cells was cured at 150° C., and three cured cells were taken at random and their cell gap measured using a micrometer to give a mean value of 31.7 μm. The cell was filled with an electrolyte which comprised of an ionic liquid 1-butyl-1-methylpyrrolidinium 1,1,1-trifluoro-N-[(trifluoromethyl)sulfonyl]-methanesulfonamide and propylene carbonate (in 60:40 volumetric proportion) along with 0.06M Fc-Vio imide dye (1-(4-ferrocenylbutyl)-1-methyl-4-bipridinium and 1,1,1-trifluoro-N-[(trifluoromethyl)sulfonyl]-methanesulfonamide). Assuming no change in volume when the ionic liquid and the PC are mixed, the total concentration of the ionic species including the dye is 2.05M. This is a bridged dye with both anodic and cathodic moieties bonded covalently. One could also use separate dyes such as viologen salt and phenazine as used in several of the references described herein. Electrochromic properties of such a cell are shown in the table below. Optical properties were measured at 550 nm. High end refers to the reflectivity in the bleached state and low end refers to the reflectivity in the colored state. The range refers to the difference between the two.

| Temperature | Potential (V) | High End (% R) | Low End (% R) | Time to Color 50% of the range (s) | Time to Color 80% of the range (s) | Time to Bleach 50% of the range (s) | Time to Bleach 80% of the range (s) |
|---|---|---|---|---|---|---|---|
| 50° C. | 1.2 | 71 | 7.8 | 1.6 | 3.4 | 2.0 | 3.0 |
|  | 1.3 | 71 | 6.5 | 1.8 | 3.0 | 2.2 | 3.4 |
| 25° C. | 1.2 | 73 | 7.1 | 1.4 | 3.0 | 2.6 | 3.8 |
|  | 1.3 | 73 | 6.7 | 1.0 | 2.6 | 2.6 | 4.0 |

The leakage current (steady state current in the colored state) for several cells at various coloring potentials is shown below.

| Cell # | Voltage (V) | Temperature (° C.) | Leakage current (mA/cm$^2$) |
|---|---|---|---|
| B | 1.2 | 50° C. | 1.204 |
|  | 1.3 |  | 1.412 |
| C | 1.2 | 25° C. | 0.812 |
|  | 1.3 |  | 0.933 |
| A | 1.2 | −20° C. | 0.152 |
|  | 1.3 |  | 0.156 |
| B | 1.2 | −20° C. | 0.062 |
|  | 1.3 |  | 0.062 |
| C | 1.2 | −20° C. | 0.110 |
|  | 1.3 |  | 0.110 |

Example 14

Preparation and Characterization Cells with Electrolyte Gap of 12.5 μm

Fourth surface mirror cells with a 12.5 μm cell gap were prepared using 12.5 μm polyester sheeting as spacer. A gasket was cut from the sheeting and was placed between a mirror ITO and a glass ITO substrate (12Ω/sq), with drilled fill holes, to form a cell. The cell was then clipped together with binder clips and a two part epoxy was used to seal all edges of the cell. The busbars were a distance of 6.7 cm from each other and the active area distance between the busbars was the same as that in a interior mirror device. This cell was filled with electrolyte of 30% PC, 70% IL (proportions by volume) and 0.12M Fc-vio imide dye. The total concentration of the ionic species calculated as in the above example is 2.44M. Kinetic traces were taken at 1.2V, 1.3V and 1.4V at room temperature.

| Coloring Potential (V) | High end % R 550 nm | Low end % R 550 nm | Time to Color 80% range (s) | Time to Bleach 80% range (s) |
|---|---|---|---|---|
| 1.2 | 74 | 8.3 | 3.1 | 3.1 |
| 1.3 | 74 | 6.4 | 2.8 | 3.4 |
| 1.4 | 74 | 5.7 | 2.3 | 3.7 |

Example 15

Preparation and Characterization Cells with Electrolyte Gap of 6 Microns

Mirror cells with a 6 μm cell gap were prepared using 6 μm polyester sheeting as spacer. A gasket was cut from the sheeting and was placed between two ITO coated glass substrates (6Ω/sq) with drilled fill holes, to form a window cell. The cell was held together with binder clips and a two part epoxy was used to seal all edges of the cell. The busbars were a distance of 6.7 cm from each other and the active area distance between the busbars was the same as that in a interior mirror cell. To form a mirror another silver coated glass surface was attached to the above window cell ($6^{th}$ surface mirror). An electrolyte comprising 70:30 (Ionic liquid to PC as in the above example) with a dye concentration of 0.12M was filled in the cavity and then sealed. The performance of this cell at room temperature (25° C.) is given below.

| Potential Color (V) | High end, % R 550 nm | Low end, % R 550 nm | Time to Color 80% range (Seconds) | Time to Bleach 80% range (Seconds) |
|---|---|---|---|---|
| 1.2 | 72.4 | 23 | 1.5 | 1.4 |
| 1.3 | 72.4 | 19 | 1.3 | 1.3 |
| 1.4 | 72.4 | 16 | 1.2 | 1.4 |
| 1.5 | 72.4 | 15 | 1.0 | 1.3 |

Example 16

Epoxy Formulation for Perimeter Sealant

An epoxy perimeter seal formulation of an electrochromic cell was prepared from the following reagents:

| Material grade | Material type, Supplier | Quantity Used |
|---|---|---|
| SU-3.0 | Epoxy resin, Miller Stephenson, Sylmar, CA | 10.0 g |
| THPE/GE | Epoxy resin, CVC Thermoset Specialties Moorestown, NJ. | 2.04 g |
| HHMPA | Hexahydro-4-methylphthalic anhydride | 9.207 g |
| Ajicure MY-H | Hardener, Accelerator Ajinomoto, Tokyo Japan | 0.5 g |
| Fumed Silica | Cabot Corporation, Boston, MA | 1.0 g |
| Mogul L | Carbon Black, Cabot Corporation, Boston, MA | 0.12 g |
| Novakup L207A | Silicate (epoxy silane coated), Malvern, Hot Springs, AK | 25 g |
| R960 | Titanium Dioxide DuPont, Wilmington, DE | 2.4 g |
| 88 micron spacers | Potters Industries, INC Canby, OR. | 0.1 g |

The epoxy was prepared by mixing at 50° C. the Epoxy resins SU-3 and THPE/GE until a complete mixture was formed the anhydride HHMPA was added and thoroughly mixed. The mixture was allowed to reach room temperature before the hardner MY-H was added and thoroughly mixed. The fumed silica carbon black, Novakup and R960 were then added under vigorous stirring. Fumed silica is used to adjust the viscosity of the adhesive where increasing fumed silica increases viscosity, and depending on the dispensing method used, one can tailor the viscosity. Carbon black and the titanium dioxide are used to adjust the color. Once a homogeneous mixture was formed the spacer beads were then added under stirring. The final mixture was a light gray color. The inorganic content of this formulation was 56.6%. Once adhesion promotion additive (APA) as described below is added, the inorganic concentration drops in all formulations but it is still above 50% in all of these examples.

Example 17

Epoxy Formulation for Perimeter Sealant with Rubber Adduct

An epoxy perimeter seal formulation containing a rubber adduct for an electrochromic cell was prepared from the following reagents:

| Material grade | Material type | Quantity Used |
|---|---|---|
| SU-3.0 | Epoxy resin | 10.0 g |
| THPE/GE | Epoxy resin | 2.04 g |
| HHMPA | Hexahydro-4-methylphthalic anhydride | 9.207 |
| HyPox RA840 | Epoxy resin - rubber adduct, | 3.0 g |
| Ajicure MY-H | Hardener, Accelerator | 0.5 g |
| Fumed Silica | | 0.5 g |
| Mogul L | Carbon Black, Cabot Corporation | 0.48 g |
| Novakup L207A | Silicate (epoxy silane coated) | 25 g |
| R960 | Titanium Dioxide | 2.4 g |
| 123 micron spacers | Glass spacers | 0.1 g |

The epoxy was prepared by mixing at 50° C. the SU-3 and THPE/GE until a complete mixture was formed. Then the rubber adduct HyPox RA840 was added (25 parts by weight based on epoxy resin only) and the mixture heated to 90° C. with mixing. After one hour a clear yellow solution formed. The mixture was cooled to 50° C. and the anhydride HHMPA was added and thoroughly mixed. The mixture was allowed to reach room temperature before the hardener MY-H was added and thoroughly mixed. The fumed silica carbon black, Novakup and R960 were then added under vigorous stirring. Once a homogeneous mixture was formed the spacer beads were then added under stirring. The final mixture was black in color and the inorganic content by weight was 52.6%.

Example 18

Epoxy Formulation for Perimeter Sealant with Rubber Adduct

An epoxy formulation was prepared as described in Example 17 above except that the rubber adduct HyPRO 1300×8 CBTN from CVC Thermoset Specialists was used instead of HyPox RA840. HyPRO was added to the epoxy mixture (SU-3.0+THPE/GE) and heated at 90° C. for two hours. This was added as 1.2 g which is equivalent to 10 parts by weight based on the epoxy resin only. The mixture was a yellow translucent liquid. The mixture was cooled to 50° C. and the anhydride HHMPA was added and thoroughly mixed. The mixture was allowed to reach room temperature before the hardener MY-H was added and thoroughly mixed. The fumed silica carbon black, Novakup and R960 were then added under vigorous stirring. Once a homogeneous mixture was formed the spacer beads were then added under stirring.

The final mixture was black in color. The inorganic content of the formulation by weight was 54.5%.

Example 19

Epoxy Formulation for Perimeter Sealant

An epoxy perimeter seal formulation of an electrochromic cell was prepared from the following reagents:

| Material | Mataerial type | Quantity Used |
|---|---|---|
| SU-3.0 | Epoxy resin | 10.0 g |
| THPE/GE | Epoxy Resin | 2.04 g |
| HHMPA | Hexahydro-4-methylphthalic anhydride | 9.207 g |
| Ajicure, MY-H | Hardner, Accelerator | 0.5 g |
| Fumed Silica | Fumed Silica | 0.3 g |
| Mogul L | Carbon Black | 0.48 g |
| Novakup L207A | Silicate (epoxy silane coated) | 35 g |
| R960 | Ti-Pure Titanium Dioxide | 2.4 g |
| 88 micron spacers | Glass spacers | 0.1 g |

The epoxy was prepared by mixing at 50° C. the SU-3 and THPE/GE until a complete mixture was formed the anhydride HHMPA was added and thoroughly mixed. The mixture was allowed to reach room temperature before the hardener MY-H was added and thoroughly mixed. The fumed silica carbon black, Novakup and R960 were then added under vigorous stirring. Once a homogeneous mixture was formed the spacer beads were then added under stirring. The final mixture was a black color. The inorganic content of this formulation was 63% by weight.

Example 20

Adhesion Promotion Additive (APA) Preparation Based on Epoxy Silane

APA Solutions were prepared from the following reagents.

| Name | Silane I | Silane II | Water (acidified) | Other Additive |
|---|---|---|---|---|
| P1 | (3-Glycidyloxypropyl)trimethoxysilane 2.00 g (0.0085 moles) | Tetraethyl orthosilicate 0.87 g (0.0042 moles) | 0.4 g (0.022 moles) | |
| P4 | (3-Glycidyloxypropyl)trimethoxysilane 2.00 g (0.0085 moles) | 1-2-Bis(trimethoxysily)ethane 1.14 g (0.0042 moles) | 0.4 g (0.022 moles) | |
| P7 | (3-Glycidyloxypropyl)trimethoxysilane 1.00 g (0.00425 moles) | None | 0.1143 g (0.00635 moles) | |
| P9 | (3-Glycidyloxypropyl)trimethoxysilane 1.00 g (0.00425 moles) | None | 0.1143 g (0.00635 moles) | Triton X-100 Polyoxyethylene (10) isooctylcyclohexyl ether 0.0044 g |

All the silanes were supplied by Aldrich Chemical Company WI and used as received. To make each APA solution, the silanes were added to a sure seal bottle fitted with a stir bar under nitrogen atmosphere. The mixtures were stirred at room temperature and the acidified water (water with hydrochloric acid, pH=2) and Triton X-100 added. They were then placed in an oven at 60° C. for three hours to complete hydrolysis. Upon cooling to room temperature they were then ready for addition to the epoxy formulation Example 21

APA Preparation Based on Amino Silane

APA solutions were prepared from the following reagents.

| Name | Silane I (organosilane) | Silane II (crosslinker) | Other Additive |
|---|---|---|---|
| P3 | (3-Aminopropyl)triethoxysilane 0.94 g (0.00425 moles) | Tetraethyl orthosilicate 0.87 g (0.0042 moles) | None |
| P5 | (3-Aminopropyl)triethoxysilane 0.94 g (0.00425 moles)) | 1-2-Bis(trimethoxysily)ethane 0.57 g (0.0021 moles) | None |
| P6 | (3-Aminopropyl)triethoxysilane 0.94 g (0.00425 moles) | Tetraethyl orthosilicate 0.87 g (0.0042 moles) | Triton X-100 Polyoxyethylene (10) isooctylcyclohexyl ether 0.0044 g |
| P8 | 3-Aminopropyl)triethoxysilane | None | None |

All the reagents were supplied by Aldrich Chemical Company and used as received. For the APA solutions the silanes and or Triton X-100 were added to a sure seal bottle fitted with a stir bar under nitrogen atmosphere. The mixtures were stirred at room temperature for three hours prior to use.

Example 22

Addition of APA to Epoxy Formulation and Adhesion Results

The different APA solution described in Examples 20 and 21 were added to the epoxy formulations as listed below:

| Epoxy (3 g Batch) | APA |
|---|---|
| EP27-F1 | P1 (0.0364 g) |
| EP27-F1 | P4 0.0364 g) |
| EP27-F1 | P7 (0.0364 g) |
| EP27-F1 | P5 (0.0338 g) |
| EP27-F1 | P3 (0.0338 g) |
| EP93-F1 | P7 (0.01 g) |
| EP93-F1 | P5 (0.078 g) |
| EP92-F1 | P7 (0.01 g) |
| EP92-F1 | P5 (0.078 g) |
| EP89-F1 | P7 (0.01 g) |
| EP89-F1 | P5 (0.078 g) |
| EP89-F1 | P6 (0.078 g) |
| EP89-F1 | P9 (0.01 g) |

The APA solutions were added to the epoxy formulation and mixed thoroughly for 15 minutes before placing between (or sandwiching) two pieces of ITO (ITO touching epoxy) or float line glass (tin side facing epoxy). The samples were pressed until the gap between the substrates was reduced to almost the spacer thickness. The samples were cured at 150° C. for one hour under ambient atmosphere. All of these formulations resulted in excellent adhesion, as tested by inserting a blade and trying to pry off at least one of the substrates. In addition, when some of these samples (EP27 with ADA P1 and P4) were subjected to hot water (80° C.) or steam autoclave (120° C.), they retained their excellent adhesion on both ITO and tin side of glass.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The invention claimed is:

1. An electrooptic variable reflectance mirror for vehicles comprising front and rear spaced elements, each of the said elements having a rear surface and a front surface, said rear surface of the front element having a layer of transparent conductive coating disposed thereon, and said front surface of said rear element comprises at least one layer of conductive coating, wherein the said transparent conductive coating or said conductive coating comprises of a zinc oxide coating doped with at least two additional metal oxides, where the front and the rear elements are sealably bonded together in a spaced apart relationship and define a chamber there between, said chamber comprising an electrooptic medium, and wherein at least one of the rear surface of the said front element and the front surface of the said rear element has a conductive busbar deposited on its perimeter or a portion of its perimeter wherein the said busbar is formed of a composite comprising conductive nanoparticles in an organic matrix, or the said busbar is formed by deposition of nanoparticles from a suspension of the said nanoparticles in a fluid.

2. An electrooptic variable reflectance mirror for vehicles as in claim 1, wherein the nanoparticles are selected from one of metals, metal compounds, carbon nanotubes and graphene.

3. An electrooptic variable reflectance mirror for vehicles as in claim 1, wherein the said fluid comprises of water.

4. An electrooptic variable reflectance mirror for vehicles as in claim 3, wherein the deposited nanoparticles are subjected to additional treatment to form a conductive busbar.

5. An electrooptic variable reflectance mirror for vehicles as in claim 1, wherein the spaced apart front and rear elements have a perimeter sealant having more than one opening, wherein at least one opening is used for filling the electrooptic medium and one opening for venting gas in the cavity as it is being filled by the said electrooptic medium; and the geometry of the opening for the electrolyte filling comprise of a dam type structure, which has a different geometry as compared to the vent.

6. An electrooptic variable reflectance mirror for vehicles or an electrochromic window, comprising front and rear spaced elements, each of the said elements having a rear surface and a front surface, said rear surface of the front element having a layer of transparent conductive coating disposed thereon, and said front surface of said rear element comprises at least one layer of conductive coating, wherein the front and the rear elements are sealably bonded at the perimeter by a spaced apart relationship defining a chamber there between, said chamber containing an electrooptic medium, and the said perimeter sealant having more than one opening, wherein at least one opening is used for filling the electrooptic medium and one opening for venting the gas in the chamber as it is being filled by the said electrooptic medium; and the geometry of the opening for the electrolyte filling comprise of a dam type structure, which has a different geometry as compared to the vent.

7. An electrooptic variable reflectance mirror for vehicles or an electrochromic window as in claim 6, wherein, the opening used for injecting the electrooptic medium is larger as compared to an opening used for ejecting the gases in the cavity as it is filled by the electrooptic medium.

8. An electrooptic variable reflectance mirror for vehicles, comprising front and rear spaced elements, each of the said elements having a rear surface and a front surface, said rear surface of the front element having a layer of transparent conductive coating disposed thereon, and said front surface of said rear element comprising at least one layer of conductive coating, where the front and the rear elements are sealably bonded at the perimeter by a spaced apart relationship defining a chamber there between, said chamber comprising an electrooptic medium, wherein the said transparent conductive coating or the conductive coating comprises of a zinc oxide coating doped with at least two additional metal oxides.

9. An electrooptic variable reflectance mirror for vehicles or an electrochromic window as in claim 8, wherein at least one of the metal oxide dopant is selected from gallium oxide, aluminum oxide, and manganese oxide.

* * * * *